US009395197B1

(12) United States Patent
Denise

(10) Patent No.: US 9,395,197 B1
(45) Date of Patent: Jul. 19, 2016

(54) ELECTRONIC NAVIGATION RELATED TECHNOLOGY

(71) Applicant: HUDSON RIVER, SERIES 77 OF ALLIED SECURITY TRUST 1, San Francisco, CA (US)

(72) Inventor: Jason Adam Denise, Annapolis, MD (US)

(*) Notice: Subject to any disclaimer, the term of this patent is extended or adjusted under 35 U.S.C. 154(b) by 0 days.

(21) Appl. No.: 14/803,886

(22) Filed: Jul. 20, 2015

Related U.S. Application Data

(63) Continuation of application No. 14/200,358, filed on Mar. 7, 2014, now Pat. No. 9,097,545, which is a continuation of application No. 13/858,928, filed on Apr. 8, 2013, now Pat. No. 8,670,930, which is a continuation of application No. 13/214,775, filed on Aug. 22, 2011, now Pat. No. 8,417,449, which is a continuation of application No. 12/241,551, filed on Sep. 30, 2008, now Pat. No. 8,010,285.

(51) Int. Cl.
*G01C 21/34* (2006.01)
*G01C 21/36* (2006.01)

(52) U.S. Cl.
CPC ............ *G01C 21/3415* (2013.01); *G01C 21/36* (2013.01)

(58) Field of Classification Search
CPC ............. G08G 1/0129; G01C 21/3641; G01C 21/3415; G01C 21/3617; G01C 21/34
See application file for complete search history.

(56) References Cited

U.S. PATENT DOCUMENTS

| | | | | |
|---|---|---|---|---|
| 6,064,941 A | * | 5/2000 | Nimura | G01C 21/3682 340/988 |
| 2002/0082771 A1 | * | 6/2002 | Anderson | G01C 21/3484 701/423 |

* cited by examiner

*Primary Examiner* — Michael D Lang
(74) *Attorney, Agent, or Firm* — Maldjian Law Group LLC

(57) ABSTRACT

Techniques are described for monitoring whether a user is following directions to a destination during electronic navigation to the destination provided by an electronic navigation device. When the electronic navigation device determines that the user is not following directions to the destination (e.g., the user has missed several turns suggested by the electronic navigation device), the electronic navigation device determines that the user appears to be avoiding the route (or a primary component thereof) to the destination. In response to a determination that the user appears to be avoiding the route (or a primary component thereof) to the destination, the electronic navigation device may automatically, without human intervention, perform an operation directed to using an alternative route (or alternative primary component) to the destination despite the current route remaining preferred according to current routing settings.

20 Claims, 19 Drawing Sheets

ELECTRONIC NAVIGATION RELATED TECHNOLOGY

CROSS-REFERENCE TO RELATED APPLICATION(S)

This application is a continuation of U.S. application Ser. No. 14/200,358, filed Mar. 7, 2014, which is a continuation of U.S. application Ser. No. 13/858,928, filed Apr. 8, 2013, which is a continuation of U.S. application Ser. No. 13/214,775, filed Aug. 22, 2011, which is a continuation of U.S. application Ser. No. 12/241,551, filed Sep. 30, 2008, each of which is incorporated by reference herein in its entirety for all purposes.

FIELD

This document relates to electronic navigation and mapping technology.

BACKGROUND

Electronic navigation and mapping systems provide users with directions between a starting location and a destination location. An electronic device may provide electronic navigation along a route between the starting location and the destination location based on position data, such as Global Positioning System (GPS) data.

SUMMARY

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for monitoring whether a user is following directions to a destination during electronic navigation to the destination provided by an electronic navigation device. When the electronic navigation device determines that the user is not following directions to the destination (e.g., the user has missed several turns suggested by the electronic navigation device), the electronic navigation device determines that the user appears to be avoiding the route (or a primary component thereof) to the destination selected by the electronic navigation device. In response to a determination that the user appears to be avoiding the route (or a primary component thereof) to the destination, the electronic navigation device may automatically, without human intervention, perform an operation directed to using an alternative route (or alternative primary component) to the destination despite the current route remaining preferred according to current routing settings.

Figure 1:
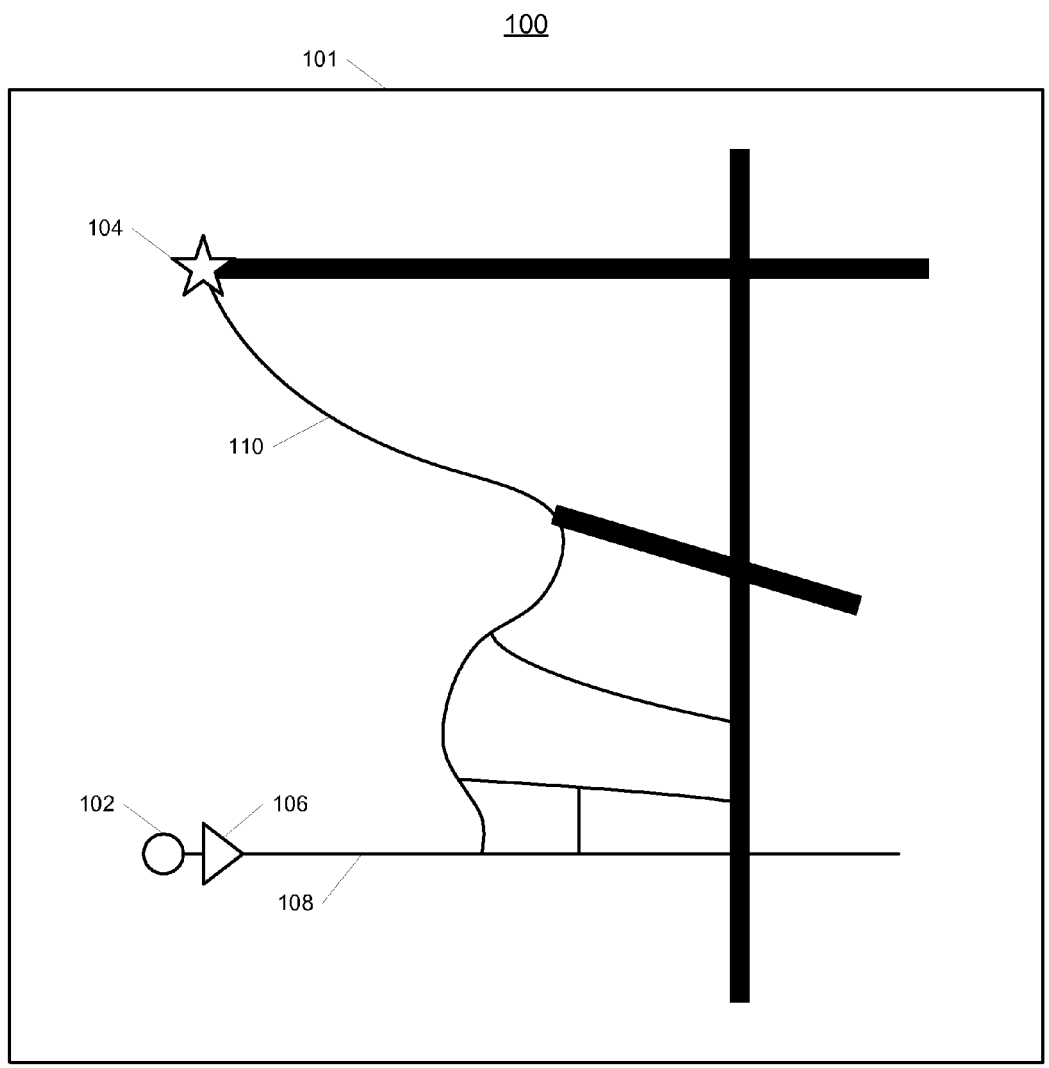
FIGS. 1-10 illustrate examples of user interfaces.

Referring to FIG. 1, a user interface 100 of a navigation device includes a mapping display area 101 that provides a display of a map of an area corresponding to a current position of a navigation device. The mapping display area 101 may display streets, points of interest, geographical elements (e.g., lakes, fields, etc.), routing information, coordinates, compass directions, etc. The size and area of the mapping display area 101 may be defined based on the current position of the navigation device and a zoom factor that defines a level of detail with which a user wishes to perceive the mapping display area 101. In some implementations, the mapping display area 101 moves as the navigation device moves and the mapping display area 101 rotates as the navigation device rotates (e.g., turns down a road traveling in a different direction).

The mapping display area 101 displays an origin location 102 and a destination location 104. The origin location 102 may be a starting point of a user using the navigation device and the destination location 104 may be a desired ending point of the user using the navigation device.

The mapping display area 101 also includes a current position indicator 106. The current position indicator 106 provides a graphical indication of the current position of the navigation device within the mapping display area 101. The navigation device may determine the current position using a position detector. For instance, the navigation display may determine the current position of the navigation device using global positioning system ("GPS") technology and display the current position indicator 106 within the mapping display area 101 at a position corresponding to the current position determined by the navigation device. The navigation device may update the current position indicator 106 continuously (or periodically) such that the current position indicator 106 tracks motion of the navigation device (e.g., as the navigation device moves along a road, the current position indicator 106 moves along a displayed representation of the road in the mapping display area 101).

When a user specifies a destination location 104, the navigation device provides, to the user, electronic navigation to the destination location 104. Providing electronic navigation may include identifying a route to the destination 104 and providing directions to the user to enable the user to follow the route. For example, the navigation device may alert the user when a change in direction is approaching (e.g., turn left onto First Street in a quarter mile). In this example, the electronic navigation device may provide turn-by-turn visual and voice guidance.

The electronic navigation device may track a current position of the electronic navigation device (e.g., using GPS technology) and determine whether the user is following the identified route or diverging from the identified route. When the user is following the identified route, the electronic navigation device maintains the identified route and continues to provide, to the user, directions along the identified route. When the user diverges from the identified route, the electronic navigation device may re-route the user back to the identified route or identify an alternative route to the destination 104 based on the current position of the navigation device.

The route (or any re-routing) identified by the navigation device may be identified based on routing settings of the navigation device. For instance, the routing settings may define a transport mode (e.g., car or on foot), route selection settings (e.g., minimize distance or minimize time), avoid highways, prefer highways, avoid tunnels, avoid ferries, and avoid toll roads (the final five settings may be yes/no options). The navigation device may identify available roads/direction of travel based on the routing settings (e.g., some roads may only be available to cars or some roads may be one-way for cars, but not for people on foot). The navigation device also may identify which roads to use in a route based on the routing settings (e.g., roads that minimize distance to the destination may be identified when a minimize distance setting is chosen or highways may not be included in the route when an avoid highways setting is chosen).

As shown in FIG. 1, the navigation device is providing electronic navigation to the destination 104. Based on the origin location 102 and/or the current position 106 of the navigation device, the navigation device identifies a route to the destination 104 that includes the road 108 and the road 110. The navigation device identifies the route as the road 108 and the road 110 based on current routing settings of the navigation device. For instance, the current routing settings of the navigation device may indicate that distance should be minimized and the route including the road 108 and the road 110 may minimize distance to the destination 104.

In another example, the current routing settings of the navigation device may indicate that time should be minimized and highways should be avoided. In this example, the route including the road 108 and the road 110 may be a route to the destination 104 that minimizes time for routes that do not include highways (e.g., other routes may be faster, but include highways). The thicker line roads shown in mapping display area 101 may be the highways included in the mapping display area 101.

In the example shown in FIG. 1, the navigation device may determine that the primary component of the identified route is the road 110. A primary component of a route may be one or more roads that represent a substantial portion of a route (e.g., more than a threshold portion of the route). A primary component may or may not represent a majority of a route to the destination.

Based on identification of the route including the road 108 and the road 110 as being the preferred route to the destination based on current routing settings, the navigation device provides electronic navigation to the user along the route to the destination. For instance, the navigation device may provide a direction list to the user that includes the road 108 and the road 110 and may provide turn-by-turn navigation along the route (e.g., the navigation device may instruct the user to turn left at road 110 when the current position of the navigation device approaches road 110).

Figure 2:
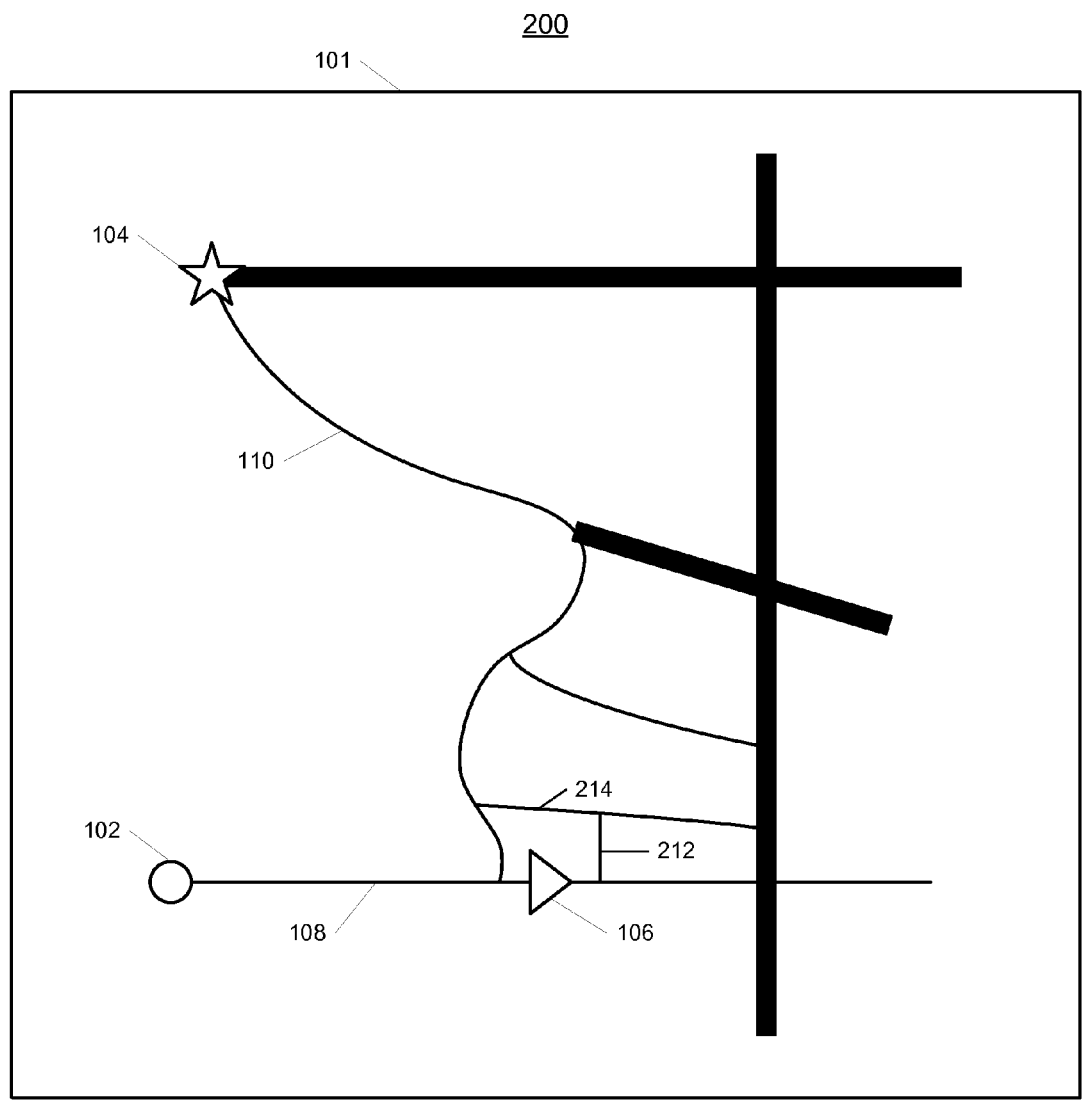

Referring to FIG. 2, a user interface 200 illustrates the mapping display area 101 at a time subsequent to a time when the user interface 100 was shown. In the user interface 200, the current position indicator 106 shows the current position of the navigation device as being on the road 108 between the road 110 and the road 212. As shown, the user has traveled past the road 110 and, thereby, diverged from the primary component of the preferred route to the destination 104. The user may have intentionally avoided the road 110 (e.g., the user may have ignored directions to turn left on the road 110) or may have accidentally missed the road 110.

Based on the user diverging from the primary component of the preferred route to the destination 104, the navigation device re-routes the user to the primary component of the preferred route to the destination 104. For instance, the navigation device identifies a route that includes the road 212 and the road 214 as being the preferred route to return to the primary component (e.g., the road 110). The navigation device also tracks the divergence as the first instance of the user avoiding the primary component (e.g., the road 110) of the route to the destination 104 preferred under current routing settings. Because only a first instance of the user avoiding the primary component is less than a threshold level of avoidance, the navigation device re-routes to the user to the primary component of the preferred route to the destination 104 and maintains current routing settings.

Figure 3:
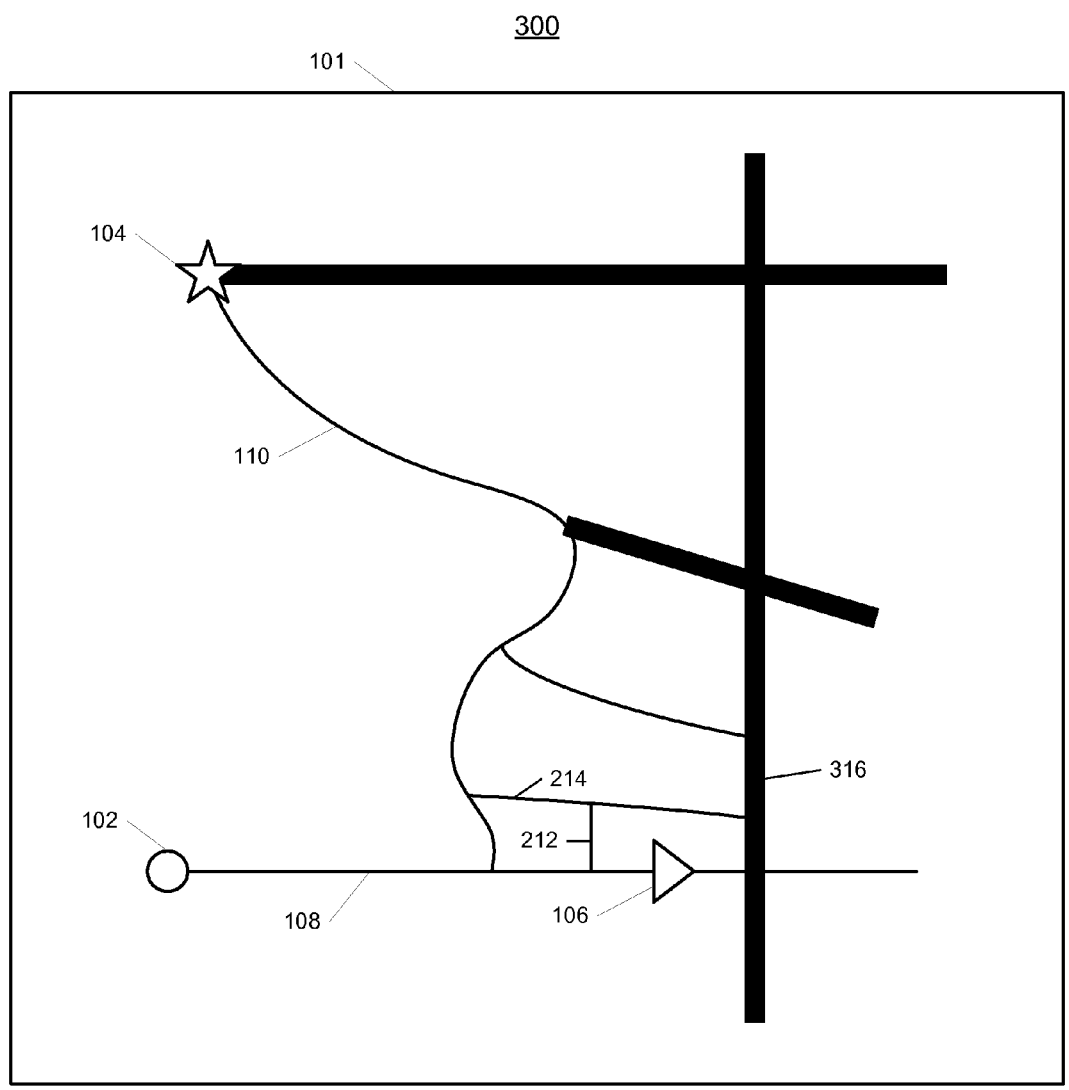

Referring to FIG. 3, a user interface 300 illustrates the mapping display area 101 at a time subsequent to a time when the user interface 200 was shown. In the user interface 300, the current position indicator 106 shows the current position of the navigation device as being on the road 108 between the road 212 and the road 316. As shown, the user has traveled past the road 212 and, thereby, diverged from the re-routing path to the primary component (e.g., the road 110) of the preferred route to the destination 104. The user may have intentionally avoided the road 212 (e.g., the user may have ignored directions to turn left on the road 212) or may have accidentally missed the road 212.

Based on the user further diverging from the primary component of the preferred route to the destination 104, the navigation device re-routes the user to the primary component of the preferred route to the destination 104. For instance, the navigation device identifies a route that includes the road 316 and the road 214 as being the preferred route to return to the primary component. The navigation device also tracks the divergence as the second instance of the user avoiding the primary component (e.g., the road 110) of the route to the destination 104 preferred under current routing settings. Because only two instances of the user avoiding the primary component is less than a threshold level of avoidance, the navigation device re-routes to the user to the primary component of the preferred route to the destination 104 and maintains current routing settings.

Figure 4:
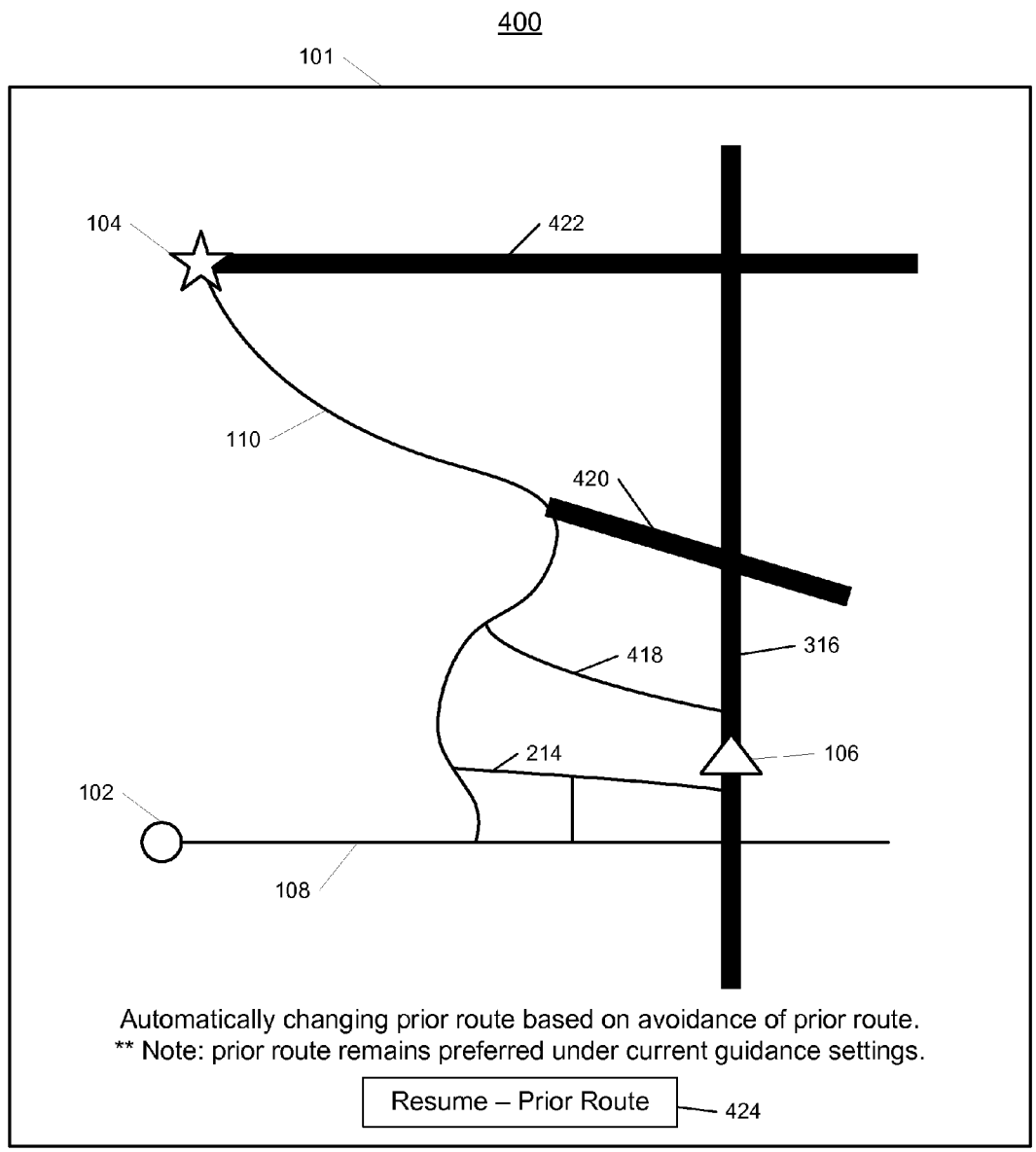

Referring to FIG. 4, a user interface 400 illustrates the mapping display area 101 at a time subsequent to a time when the user interface 300 was shown. In the user interface 400, the current position indicator 106 shows the current position of the navigation device as being on the road 316 between the road 214 and the road 418. As shown, the user has traveled past the road 214 and, thereby, diverged from the re-routing path to the primary component of the preferred route to the destination 104. The user may have intentionally avoided the road 214 (e.g., the user may have ignored directions to turn left on the road 214) or may have accidentally missed the road 214.

Based on the user further diverging from the primary component of the preferred route to the destination 104, the navigation device tracks the divergence as the third instance of the user avoiding the primary component (e.g., the road 110) of the route to the destination 104 preferred under current routing settings. In response to identifying the current divergence from the primary component of the preferred route to the destination 104 as being the third instance of divergence, the navigation device automatically, without user intervention, determines that the user appears to be avoiding the primary component (e.g., the road 110) of the route to the destination 104 preferred under current routing settings. Based on the determination that the user appears to be avoiding the primary component (e.g., the road 110) of the route to the destination 104 preferred under current routing settings, the navigation device automatically, without human intervention, identifies an alternative route to the destination without re-routing to the primary component (e.g., the road 110) despite the primary component (e.g., the road 110) remaining a part of the route to the destination 104 preferred under current routing settings.

For instance, as shown in FIG. 4, the navigation device automatically, without human intervention, identifies a route that includes the road 316 and the road 422 as the preferred alternative route to the destination 104. The navigation device identifies the route that includes the road 316 and the road 422 as being, under the current routing settings, the preferred route to the destination 104 that does not include the primary component (e.g., the road 110) the navigation device has determined the user is avoiding.

The route that includes the road 316 and the road 422 is identified as being preferred despite other routes existing that include the primary component (e.g., the road 110) that would otherwise be preferred under current routing settings. For example, the current routing settings may indicate a preference to minimize distance and avoid highways if possible. In this example, a route that re-routes the navigation device to the road 110 using the road 418 may be preferred to the route that includes the road 316 and the road 422. However, the route that includes the road 316 and the road 422 may be selected by the navigation device because that route does not include the primary component (e.g., the road 110) the user appears to be avoiding and the navigation device avoids the road 110 in identifying the alternative route based on the determination that the user appears to be avoiding the road 110.

In another example, the current routing settings may indicate a preference to minimize time. In this example, a route that re-routes the navigation device to the road 110 using the road 420 may be preferred to the route that includes the road 316 and the road 422. However, the route that includes the road 316 and the road 422 may be selected by the navigation device because that route does not include the primary component (e.g., the road 110) the user appears to be avoiding and the navigation device avoids the road 110 in identifying the alternative route based on the determination that the user appears to be avoiding the road 110.

The user interface 400 also includes a notification message that indicates that the prior route is being automatically changed and that indicates that the prior route remains preferred under current routing settings. In some implementations, the notification message may identify the primary component (e.g., the road 110) of the prior route that the navigation device determined that the user is avoiding and indicate that the automatic change in the route is based on the user's avoidance of the primary component (e.g., the road 110) of the prior route.

The notification message informs the user of the automatic change in route and enables the user to determine whether the automatic change in route is desired. In addition, the user interface 400 includes a user interface control 424 that enables the user to select to resume the prior route. When the user activates the user interface control 424, the navigation device changes the preferred route back to the prior route and overrides the determination that the user is avoiding the primary component of the prior route. In some examples, when the user activates the user interface control 424, the navigation device makes the primary component (e.g., the road 110) available for use in identifying a preferred route and identifies the preferred route based on the current routing settings and the current position of the navigation device.

The user also may ignore the notification message and allow the alternative route to be chosen as the preferred route. In this regard, the navigation device provides, to the user, electronic navigation along the alternative route (e.g., the route that includes the road 316 and the road 422) to the destination 104.

By automatically, without human intervention, determining that the user appears to be avoiding the prior route and changing the preferred route to an alternative route that avoids at least a portion of the prior route, the navigation device may provide electronic navigation to the destination 104 that is more in line with the user's preferences. For instance, an unsophisticated or lazy user may not properly configure the routing settings to the user's actual routing preferences. In this instance, because the routing settings may not be aligned with the user's preferences, the routes identified by the navigation device using the routing settings may not actually be preferred by the user. As such, automatically identifying an alternative route when the navigation infers that the user is avoiding a prior route may better reflect the actual routing preferences of the user.

In addition, automatically, without human intervention, determining that the user appears to be avoiding the prior route and changing the preferred route to an alternative route that avoids at least a portion of the prior route may reduce user annoyance and frustration with the navigation device. For example, if the navigation device continues to attempt to re-route the user to a route (e.g., primary component of a route) that the user wishes to avoid, the user may become frustrated and annoyed with the navigation device. By automatically inferring the user's intent to avoid the route (e.g., primary component of the route) and re-routing the user accordingly, the navigation device may avoid at least some of the frustration and annoyance of the user and, thereby, enhance the user's experience and satisfaction with the navigation device.

Moreover, automatically, without human intervention, determining that the user appears to be avoiding the prior route and changing the preferred route to an alternative route that avoids at least a portion of the prior route may increase the safety of using the navigation device. Specifically, because the intent of the user is automatically inferred and the route is automatically changed, the navigation device may reduce the user's required interactions with the navigation device in selecting an alternative route. Reducing the user's required interactions with the navigation device may increase the safety of using the navigation device by reducing the amount of attention the user pays to the navigation device while driving. In some examples, the user may not have to provide any user input to the navigation device in determining that the user wishes to avoid the current route (e.g., the primary component of the current mute) and identifying an alternative route.

In some implementations, although the navigation device may automatically change the current, preferred route to an alternative route that avoids at least a portion of the current route in response to determining that the user appears to be avoiding the current route (e.g., the primary component of the current route), the navigation device may automatically, without human intervention, suggest that the current route (e.g., the primary component of the current route) be changed. For instance, the navigation device may display, on an interface of a display of the navigation device, a message suggesting a change in the current route and request user input from the user regarding whether the user wishes to change the current route. The navigation device may audibly alert the user that the message suggesting the change has been displayed on may audibly make the suggestion to the user instead of (or in addition to) displaying the message suggesting the change.

Figure 5:
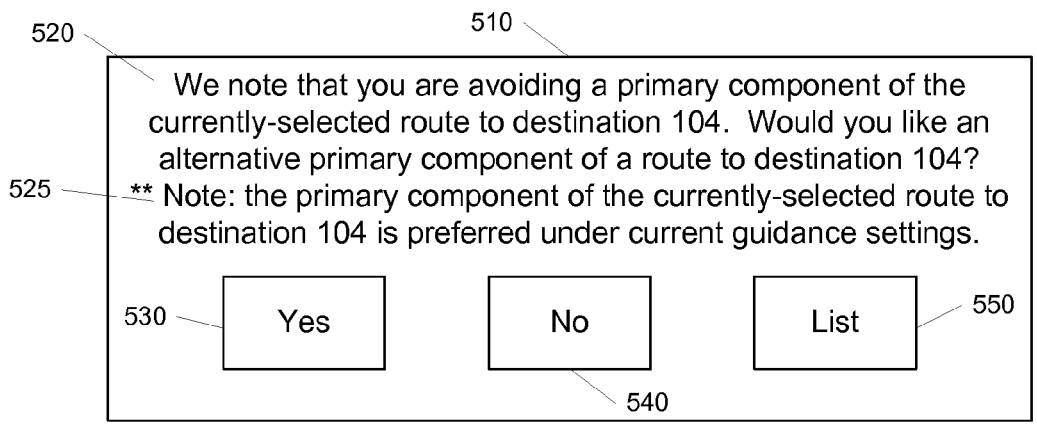

Referring to FIG. 5, a user interface includes a suggestion message 510 that includes a suggestion portion 520 and an informational portion 525. The suggestion portion 520 indicates that the navigation device has determined that the user appears to be avoiding a primary component of the currently-selected route to the destination 104 and asks the user whether the user would like to find an alternative primary component of a route to the destination 104. The informational portion 525 provides a message to the user indicating that the primary component of the currently-selected route remains preferred under current guidance or routing settings. The informational portion 525 may inform the user's decision regarding whether to find an alternative route that includes a different primary component. The navigation device may automatically, without human intervention, display the suggestion message 510 in response to a determination that the user appears to be avoiding the primary component of the currently-selected route to the destination 104.

The suggestion message 510 also includes a "yes" user input control 530 and a "no" user input control 540. The "yes" user input control 530 may be configured to receive user input from a user and, in response to user selection, initiate a process that causes the navigation device to identify a route to the destination 104 that includes an alternative primary component and provide electronic navigation to the destination 104 along the route that includes the alternative primary component. The "no" user input control 540 may be configured to receive user input from a user and, in response to user selection, close the suggestion message 510 and cause the navigation device to maintain the currently-selected route as the preferred route to the destination 104 and continue providing electronic navigation along the currently-selected route.

The suggestion message 510 also includes a "list" user input control 550. The "list" user input control 550 may be configured to receive user input from a user and, in response to user selection, cause the navigation device to display a list of alternative routes (or alternative primary components) to the destination 104. For example, in response to user selection of the "list" user input control 550, the navigation device may display a list of other potential primary components of routes to the destination 104. In this example, the primary components of routes displayed in the list may be selectable by the user and, when the user selects a primary component included in the list, the navigation device identifies a route to the destination 104 that includes the selected primary component and provides electronic navigation to the destination 104 along the route that includes the selected primary component.

Figure 6:
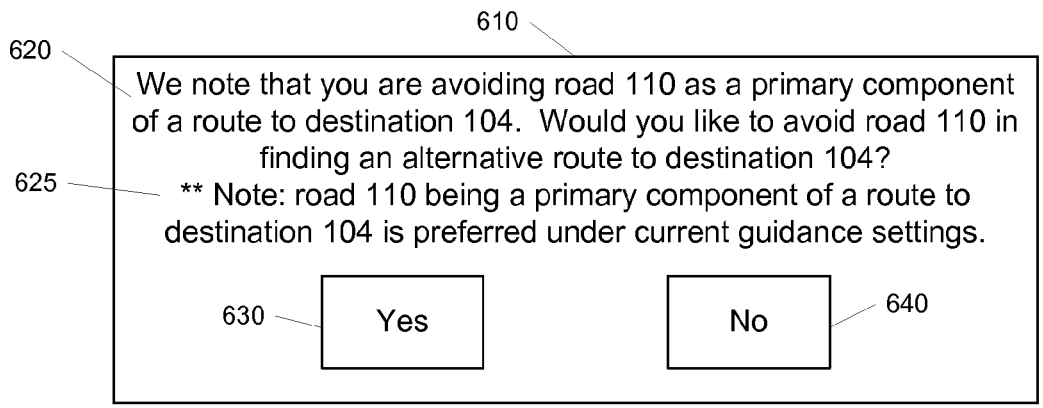

FIG. 6 illustrates another example of a suggestion message 610 that the navigation device may automatically, without human intervention, display in response to a determination that the user appears to be avoiding the primary component of the currently-selected route to the destination 104. The suggestion message 610 includes a suggestion portion 620 and an informational portion 625. The suggestion portion 620 indicates that the navigation device has determined that the user appears to be avoiding the road 110 as a primary component of the currently-selected route to the destination 104 and asks the user whether the user would like to avoid the road 110 in finding an alternative route to the destination 104.

By specifically identifying the road 110 as the primary component of a route the user appears to be avoiding, the suggestion message 610 may inform the decision of the user and allow the user to more accurately express the user's intention. For instance, although the user may be avoiding a portion of the currently-selected route, the portion being avoided by the user may not be the road 110. Accordingly, the user may not wish to avoid the road 110, but rather avoid another portion of the currently-selected route. The navigation device may enable the user to identify the portion of the route the user is avoiding and may display a list of portions of the currently-selected route and request that the user identify the portion of the currently-selected route that the user is avoiding (or wishes to avoid in identifying an alternative route to the destination 104).

The informational portion 625 provides a message to the user indicating that the road 110 remains a primary component of the route preferred under current guidance or routing settings. The informational portion 625 may inform the user's decision regarding whether to find an alternative route that avoids the road 110.

The suggestion message 610 also includes a "yes" user input control 630 and a "no" user input control 640. The "yes" user input control 630 may be configured to receive user input from a user and, in response to user selection, initiate a process that causes the navigation device to identify a route to the destination 104 that avoids the road 110 and provide electronic navigation to the destination 104 along the route that avoids the road 110. The "no" user input control 640 may be configured to receive user input from a user and, in response to user selection, close the suggestion message 610 and cause the navigation device to maintain the currently-selected route as the preferred route to the destination 104 and continue providing electronic navigation along the currently-selected route.

Figure 7:
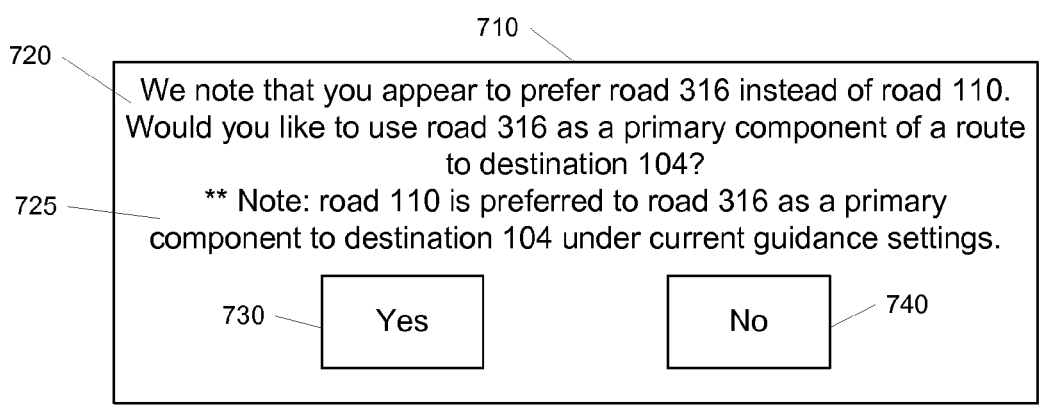

FIG. 7 illustrates another example of a suggestion message 710 that the navigation device may automatically, without human intervention, display in response to a determination that the user appears to be avoiding the primary component of the currently-selected route to the destination 104. In this example, in addition to determining that the user appears to be avoiding the primary component of the currently-selected route to the destination 104, the navigation device also attempts to determine the primary component the user appears to be following to the destination 104. The navigation device may determine the primary component the user appears to be following to the destination 104 by comparing the path the user has taken in traveling to the destination 104 to the possible routes to the destination 104 other than the currently-selected route. Based on the comparison, the navigation device identifies the route that most closely matches the path the user has taken in traveling to the destination 104.

The suggestion message 710 includes a suggestion portion 720 and an informational portion 725. The suggestion portion 720 identifies the primary component that the navigation device determined the user appears to be following to the destination 104 and allows the user to select that primary component to use in identifying a route to the destination 104. For instance, the suggestion portion 720 indicates that the navigation device has determined that the user appears to prefer the road 316 to the road 110 as a primary component of a route to the destination 104 and asks the user whether the user would like to use the road 316 as a primary component to the destination 104. In implementations in which the navigation device automatically, without user intervention, changes the route to the destination, the navigation device may account for a determination of the route the user appears to be following to the destination 104 (e.g., using or applying a higher weight to the route the user appears to be following to the destination 104).

The informational portion 725 provides a message to the user indicating that the road 110 remains preferred to the road 316 as a primary component of a route to the destination under current guidance or routing settings. The informational portion 725 may inform the user's decision regarding whether to use the road 316 as opposed to the road 110 in identifying a route to the destination 104.

The suggestion message 710 also includes a "yes" user input control 730 and a "no" user input control 740. The "yes" user input control 730 may be configured to receive user input from a user and, in response to user selection, initiate a process that causes the navigation device to identify a route to the destination 104 that uses the road 316 and provide electronic navigation to the destination 104 along the route that uses the road 316. The "no" user input control 740 may be configured to receive user input from a user and, in response to user selection, close the suggestion message 710 and cause the navigation device to maintain the currently-selected route as the preferred route to the destination 104 and continue providing electronic navigation along the currently-selected route.

The user interfaces shown in FIGS. 5-7 may be displayed in any variety of combinations. For instance, all three of the interfaces may be displayed together or the user interface 500 may be displayed first and one or both of the user interfaces 600 and 700 may be displayed when the user selects the "yes" user input control 530. Some implementations may include other variations.

In some implementations, the navigation device may, alternatively or additionally, automatically, without human intervention, suggest that the current routing settings be changed. For instance, the navigation device may display, on an interface of a display of the navigation device, a message suggesting a change in the current routing settings and request user input from the user regarding whether the user wishes to change the current routing settings. The navigation device may audibly alert the user that the message suggesting the change has been displayed on may audibly make the suggestion to the user instead of (or in addition to) displaying the message suggesting the change.

Figure 8:
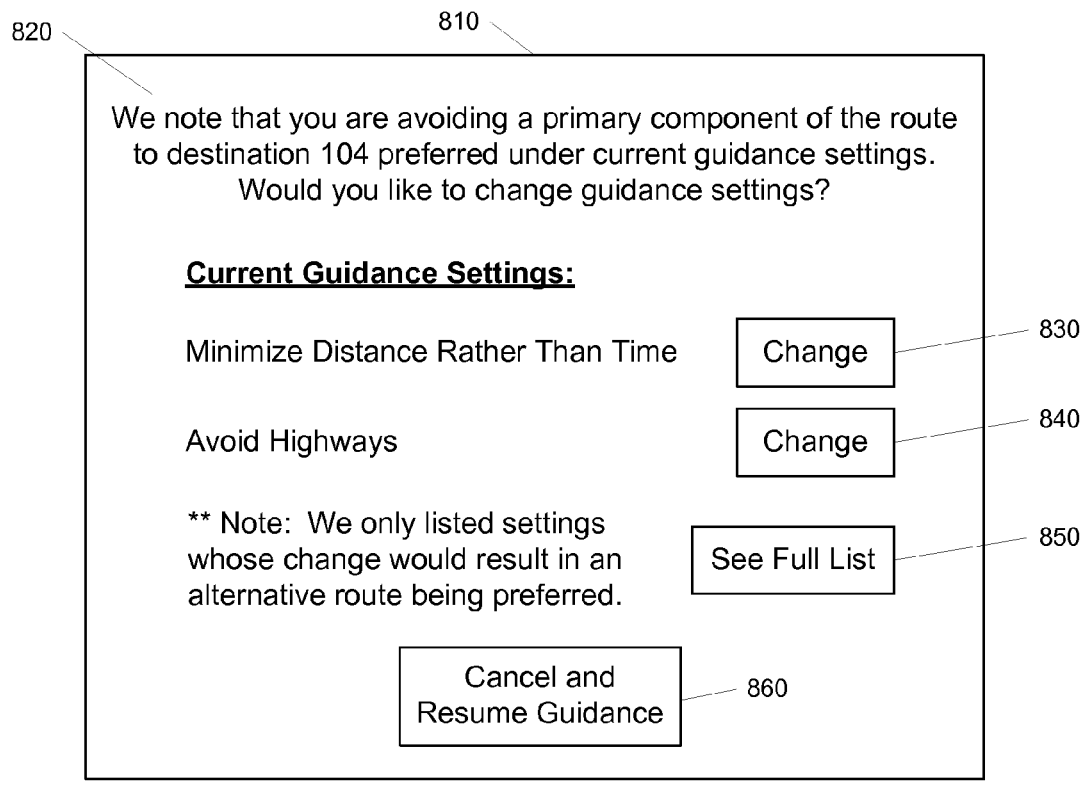

Referring to FIG. 8, a user interface includes a suggestion message 810 that includes a suggestion portion 820 that indicates that the navigation device has determined that the user appears to be avoiding a primary component of a route to the destination 104 preferred under current guidance or routing settings and asks the user whether the user would like to change the current guidance or routing settings. Because the user is not following the route preferred under the current guidance or routing settings, the suggestion portion 820 enables the user to consider whether a change in guidance or routing settings is needed to better reflect the user's routing preferences.

The suggestion message 810 also includes a list of guidance or routing setting options. The list of guidance or routing setting options may include only those settings for which a change would result in a preferred route to the destination being different than the currently-selected route. For instance, the navigation device may analyze the possible guidance or routing settings, identify a preferred route for each combination of guidance or routing settings (including changes), identify guidance or routings settings for which a change results in a route that is different than the currently-selected route, and display only the identified guidance or routing settings for user selection. The suggestion message 810 further includes a message indicating that the navigation device has listed only those settings whose change would result in an alternative route being preferred.

The suggestion message 810 may include one or more user input controls that enable a change of a setting for each setting included in the list of guidance or routing setting options. For instance, the suggestion message 810 may include a user interface control 830 associated with the routing setting "minimize distance rather than time." User selection of the user interface control 830 may initiate a process that changes the current routing setting of "minimize distance rather than time" to the routing setting of "minimize time rather than distance." In response to the change in the routing setting from "minimize distance rather than time" to "minimize time rather than distance," the navigation device identifies a new preferred route using the changed routing settings and automatically, without human intervention, changes the route to the destination 104 to the new preferred route and provides electronic navigation along the new preferred route. In the example shown in FIGS. 1-4, the route that includes the road 110, which may minimize distance, may be changed to the route that includes the road 420 and the road 110, which may minimize time.

The suggestion message 810 also may include a user interface control 840 associated with the routing setting "avoid highways." User selection of the user interface control 830 may initiate a process that changes the current routing setting of "avoid highways" from a setting of "yes" to a setting of "no." In response to the change in the "avoid highways" routing setting from "yes" to "no," the navigation device identifies a new preferred route using the changed routing settings and automatically, without human intervention, changes the route to the destination 104 to the new preferred route and provides electronic navigation along the new preferred route. In the example shown in FIGS. 1-4, the route that includes the road 110, which may avoid highways, may be changed to the route that includes the road 316 and the road 422, which includes highways, based on the change in the "avoid highways" routing setting from "yes" to "no."

In some implementations, the suggestion message 810 enables a user to select the value in changing a guidance or routing setting. The suggestion message 810 also may enable a user to change multiple guidance or routing settings.

The suggestion message 810 may include a list user input control 850 and a cancel user input control 860. The list user input control 850 may be configured to receive user input from a user and, in response to user selection, cause the navigation device to display a list that includes the other guidance or routing settings that have not been displayed. The cancel user input control 860 may be configured to receive user input from a user and, in response to user selection, close the suggestion message 810 and cause the navigation device to maintain the current guidance or routing settings.

Figure 9:
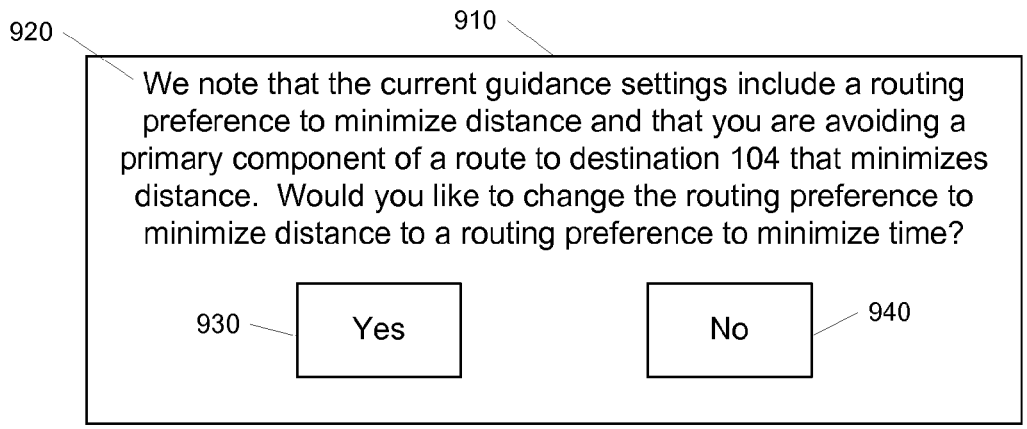

FIG. 9 illustrates another example of a suggestion message 910 that the navigation device may automatically, without human intervention, display in response to a determination that the user appears to be avoiding a primary component of a route preferred under current guidance or routing settings. The suggestion message 910 includes a suggestion portion 920 that indicates that the navigation device has determined that the user appears to be avoiding a route that minimizes distance and asks the user whether the user would like to change the routing settings from minimizing distance to minimizing time.

By specifically identifying the routing setting the user appears to be avoiding, the suggestion message 910 may inform the decision of the user of whether to change routing settings and allow the user to more accurately express the user's intention. For instance, although the user may be avoiding a particular setting that led to selection of the currently-selected route, the routing setting being avoided by the user may not be the "minimize distance" setting. Accordingly, the user may not wish to change the routing setting of minimizing distance, but rather change another routing setting that led to selection of the currently-selected route. The navigation device may enable the user to identify the routing setting the user is avoiding and may display a list of routing settings and request that the user identify the routing setting the user is avoiding (or wishes to change in identifying an alternative route to the destination 104).

The suggestion message 910 also includes a "yes" user input control 930 and a "no" user input control 940. The "yes"

user input control 930 may be configured to receive user input from a user and, in response to user selection, initiate a process that causes the navigation device to change the routing settings from minimizing distance to minimizing time. In response to the routing settings change, the navigation device may identify a new route to the destination 104 using the changed routing settings and provide electronic navigation to the destination 104 along the new route. The "no" user input control 940 may be configured to receive user input from a user and, in response to user selection, close the suggestion message 910 and cause the navigation device to maintain the current routing settings and continue providing electronic navigation along the currently-selected route.

Figure 10:
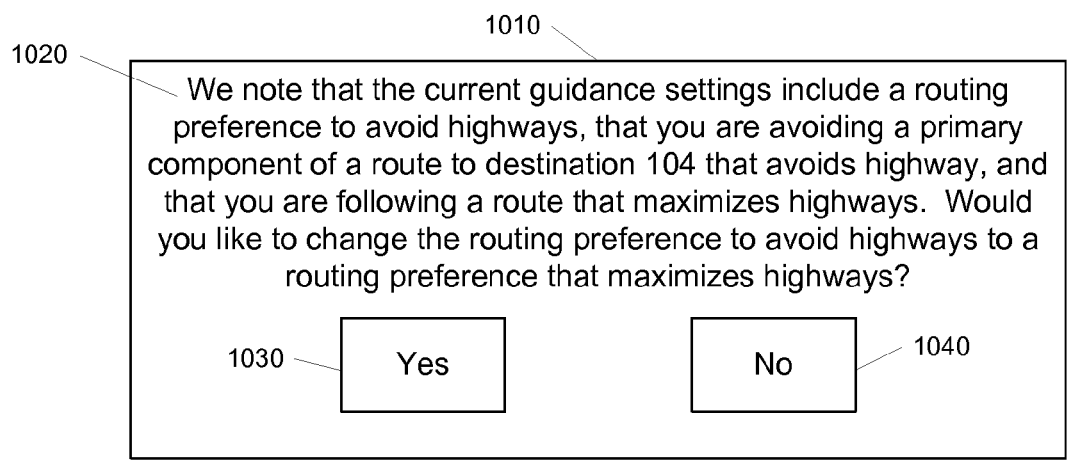
Figure 11:
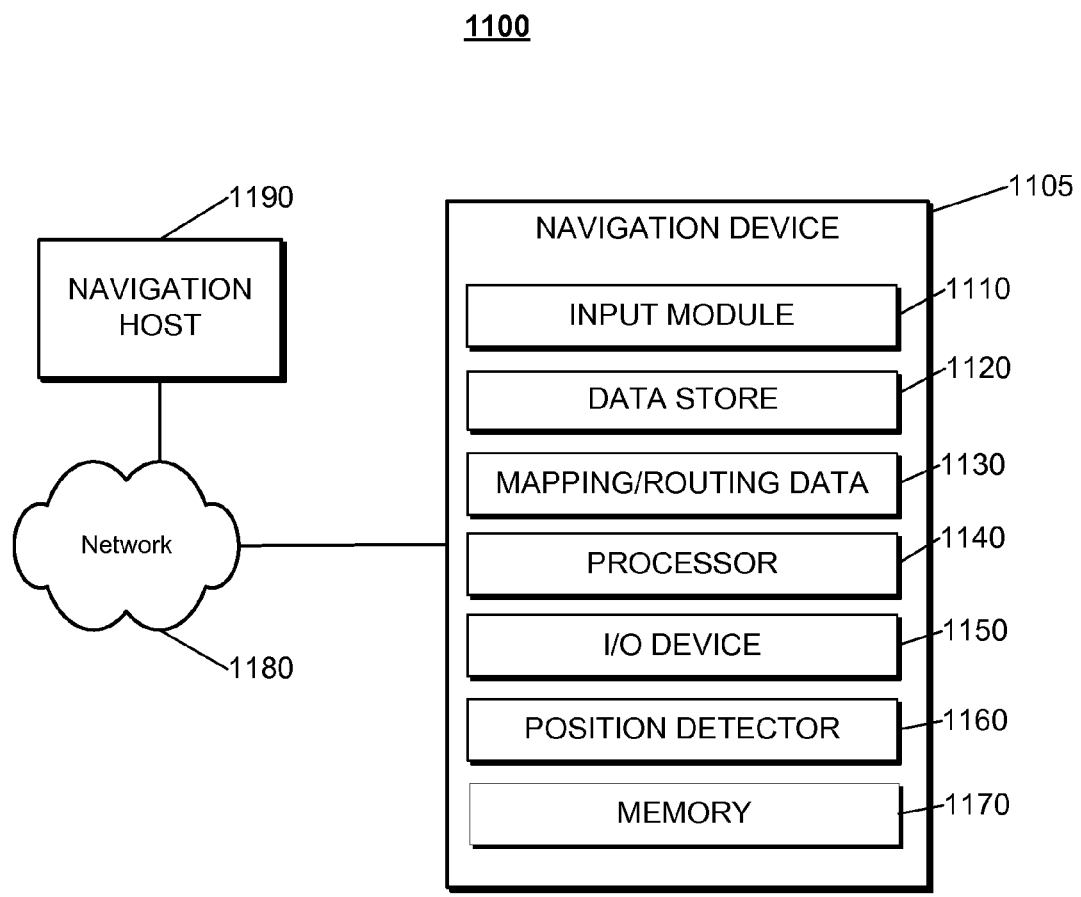
FIG. 11 depicts an example of an electronic navigation system.

FIG. 10 illustrates another example of a suggestion message 1010 that the navigation device may automatically, without human intervention, display in response to a determination that the user appears to be avoiding a primary component of a route preferred under current guidance or routing settings. In this example, in addition to determining that the user appears to be avoiding a routing setting that led to the currently-selected route to the destination 104, the navigation device also attempts to determine a routing setting the user appears to prefer in finding a route to the destination 104. The navigation device may determine the routing setting the user appears to prefer by identifying characteristics of the path the user has taken in traveling to the destination 104. The navigation device further may compare the characteristics of the path the user has taken in traveling to the destination 104 to characteristics of the currently-selected route and, based on the comparison, identify characteristics that differ and suggest a change in routing settings related to the characteristics that differ.

The suggestion message 1010 includes a suggestion portion 1020 that identifies the routing setting that the navigation device determined the user appears prefer and allows the user to select that routing setting to use in identifying a route to the destination 104. For instance, the suggestion portion 1020 indicates that the navigation device has determined that the user appears to prefer a routing setting that maximizes highways as opposed to the current routing setting to avoid highways and asks the user whether the user would like to use the routing setting that maximizes highways.

The suggestion message 1010 also includes a "yes" user input control 1030 and a "no" user input control 1040. The "yes" user input control 1030 may be configured to receive user input from a user and, in response to user selection, initiate a process that causes the navigation device to change the routing settings from avoiding highways to maximizing highways. In response to the routing settings change, the navigation device may identify a new route to the destination 104 using the changed routing settings and provide electronic navigation to the destination 104 along the new route. The "no" user input control 1040 may be configured to receive user input from a user and, in response to user selection, close the suggestion message 1010 and cause the navigation device to maintain the currently-selected route as the preferred route to the destination 104 and continue providing electronic navigation along the currently-selected route.

The user interfaces shown in FIGS. 8-10 may be displayed in any variety of combinations. For instance, all three of the interfaces may be displayed together. Some implementations may include other variations.

In addition, in some examples, routing settings may be changed by the navigation device automatically, without human intervention. For instance, instead of displaying a suggestion message suggesting a change in routing settings, the navigation device may automatically make the change in routing settings and provide the user with a notification message indicating that the change has been made.

By suggesting a change in routing settings (or automatically changing routing settings), the navigation device may provide electronic navigation to the destination 104 that is more in line with the user's preferences. For example, an unsophisticated or lazy user may not properly configure the routing settings to the user's actual routing preferences. In this example, by suggesting a change in routing settings (or automatically changing routing settings), the navigation device may assist an unsophisticated or lazy user in obtaining routing settings that reflect the user's actual routing preferences. In obtaining routing settings that reflect the user's actual routing preferences, a preferred route to the destination 104 may be identified and identification of future routes to future destinations may be enhanced.

Referring to FIG. 1, a block diagram of an electronic navigation system 1100 is shown. The system 1100 includes an electronic navigation device 1105, a network 1180, and a navigation host 1190. The network 1180 enables the electronic navigation device 1105 and the navigation host 1190 to exchange electronic communications.

The electronic navigation device 1105 includes an input module 1110, a data store 1120, mapping and routing data 1130, a processor 1140, an input/output (I/O) device 1150, a position detector 1160, and a memory 1170. The electronic navigation device 1105 may be used to provide electronic navigation operations to a user. The electronic navigation device 1105 may be a portable standalone device or may be attached to a mobile vehicle (e.g., an automobile, a boat, etc.). The electronic navigation device 1105 may be implemented within hardware or a combination of hardware and software.

The input module 1110 imports data associated with electronic navigation. The data may include data resulting from a mapping or navigation process. The data also may include data related to routing settings that are used in identifying preferred routes to destinations. The input module 1110 may input data from a device (e.g., the navigation host 1190) connected to the network 1180. In some implementations, the input module 1110 reformats and/or transforms the data such that the data may be processed and stored by other components within the electronic navigation device 1105.

The electronic navigation device 1105 also includes a data store 1120. In some implementations, data from the input module 1110 is stored in the data store 1120. The data store 1120 may be, for example, a database that logically organizes data into a series of database tables. The data store 1120 may be a hard disk drive, non-volatile memory (e.g., Flash memory), or another type of electronic storage device.

The electronic navigation device 1105 also includes mapping and routing data 1130. The mapping and routing data 1130 may include cartographic data that the electronic navigation device uses to identify routes to destinations and provide electronic navigation to the destinations. The mapping and routing data 1130 also may include routing settings that represent a user's routing preferences and that are used by the electronic navigation device 1105 to identify a preferred route to a destination. The data 1130 further may include point of interest information that is used in performing a search for a type of point of interest. In some implementations, the mapping and routing data 1130 may be received, by the electronic navigation device 1105, from the navigation host 1190.

The electronic navigation device 1105 also includes a processor 1140. The processor 1140 may be a processor suitable for the execution of a computer program such as a general or special purpose microprocessor, and any one or more processors of any kind of digital computer. Generally, a processor receives instructions and data from a read-only memory or a random access memory or both. The processor 1140 receives instructions and data from the components of the electronic navigation device 1105 to, for example, identify preferred routes to destinations and provide electronic navigation to the destinations. In some implementations, the electronic navigation device 1105 includes more than one processor.

The electronic navigation device 1105 also includes the I/O device 1150, which is configured to allow a user selection. For example, the I/O device 1150 may be a mouse, a keyboard, a stylus, a touch screen, a track ball, a toggle control, one or more user input buttons, a microphone, or any other device that allows a user to input data into the electronic navigation device 1105 or otherwise communicate with the electronic navigation device 1105. In some implementations, the user may be a machine and the user input may be received from an automated process running on the machine. In other implementations, the user may be a person.

The I/O device 1150 also may include a device configured to output mapping and electronic navigation data. For instance, the I/O device 1150 may include a display device configured to display graphical user interfaces (e.g., the user interfaces shown in FIGS. 1-10 and 16-23) that enable a user to perceive electronic navigation directions/mapping information and enable a user to interact with the electronic navigation device 1105. The I/O device 1150 also may include a speaker configured to provide audible output related to electronic navigation directions/mapping information (e.g., audible directions).

The electronic navigation device 1105 also includes the position detector 1160. The position detector 1160 may be any type of electronic device configured to detect a position of the electronic navigation device 1105. The position detector 1160 may include an accelerometer or a camera configured to detect a position of the electronic navigation device 1105. The detected position may be used as input data in providing navigation using the navigation device 1150.

The position detector 1160 may be a global positioning system ("GPS") receiver that calculates its position by timing signals sent by GPS satellites orbiting above the Earth. In some examples, each satellite continually transmits messages including the time the message was sent, a precise orbit for the satellite sending the message (the ephemeris), and the general system health and rough orbits of all GPS satellites (the almanac). These signals travel at the speed of light (which varies between vacuum and the atmosphere). The GPS receiver uses the arrival time of each message to measure the distance to each satellite, from which it determines the position of the receiver (conceptually the intersection of spheres). The resulting coordinates are converted to more user-friendly forms such as latitude and longitude or location on a map.

The electronic navigation device 1105 also includes a memory 1170. The memory 1170 may be any type of tangible machine-readable storage medium. The memory 1170 may, for example, store the data included in the data store 1120. In some implementations, the memory 1170 may store instructions that, when executed, cause the electronic navigation device 1105 to, for example, identify preferred routes to destinations and provide electronic navigation to the destinations.

The navigation system also includes a network 1180. The network 1180 is configured to enable exchange of electronic communications between devices connected to the network 1180. For example, the network 1180 may be configured to enable exchange of electronic communications between the navigation device 1105 and the navigation host 1190. The network 1180 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (DSL)), radio, television, cable, satellite, or any other delivery or tunneling mechanism for carrying data. Network 1180 may include multiple networks or subnetworks, each of which may include, for example, a wired or wireless data pathway. The network 1180 may include a circuit-switched network, a packet-switched data network, or any other network able to carry electronic communications. For example, the network 1180 may include networks based on the Internet protocol (IP) or asynchronous transfer mode (ATM).

The navigation host 1190 is an electronic device configured to execute programs and exchange communications with the navigation device 1105 (e.g., multiple navigation devices) over the network 1180. For example, the navigation host 1190 may be configured to execute a program that performs navigation, mapping, routing, and searching operations. In this example, the navigation host 1190 may exchange communications with the navigation device 1105 to receive input associated with navigation and routing and provide output to the navigation device 1105 based on the input associated with navigation and routing.

The navigation host 1190 also may be configured to perform other processes associated with navigation, routing, and mapping processes. For example, the navigation host 1190 may be configured to perform authentication of users of the navigation system 1100 and control access privileges for users. The navigation host 1190 may authenticate users who access the navigation host 1190 using the navigation device 1105. The navigation host 1190 may authenticate users based on a user name and password entered by the user or other authentication techniques such as digital signatures or certificates. The navigation host 1190 may control the data a particular user may access, the data the particular user may input and the functions the particular user may execute based on authentication and access privileges associated with the particular user.

Although the example electronic navigation device 1105 is shown as a single integrated component, one or more of the modules and applications included in the electronic navigation device 1105 may be implemented separately from the device 1105 but in communication with the device 1105. For example, the data store 1120 may be implemented on a centralized server that communicates and exchanges data with the electronic navigation device 1105. In this example, the navigation host 1190 may communicate with the electronic navigation device 1105 and perform operations described above as being performed by the electronic navigation device 1105 or may perform operations that assist in the electronic navigation device 1105 performing operations described above.

Figure 12:
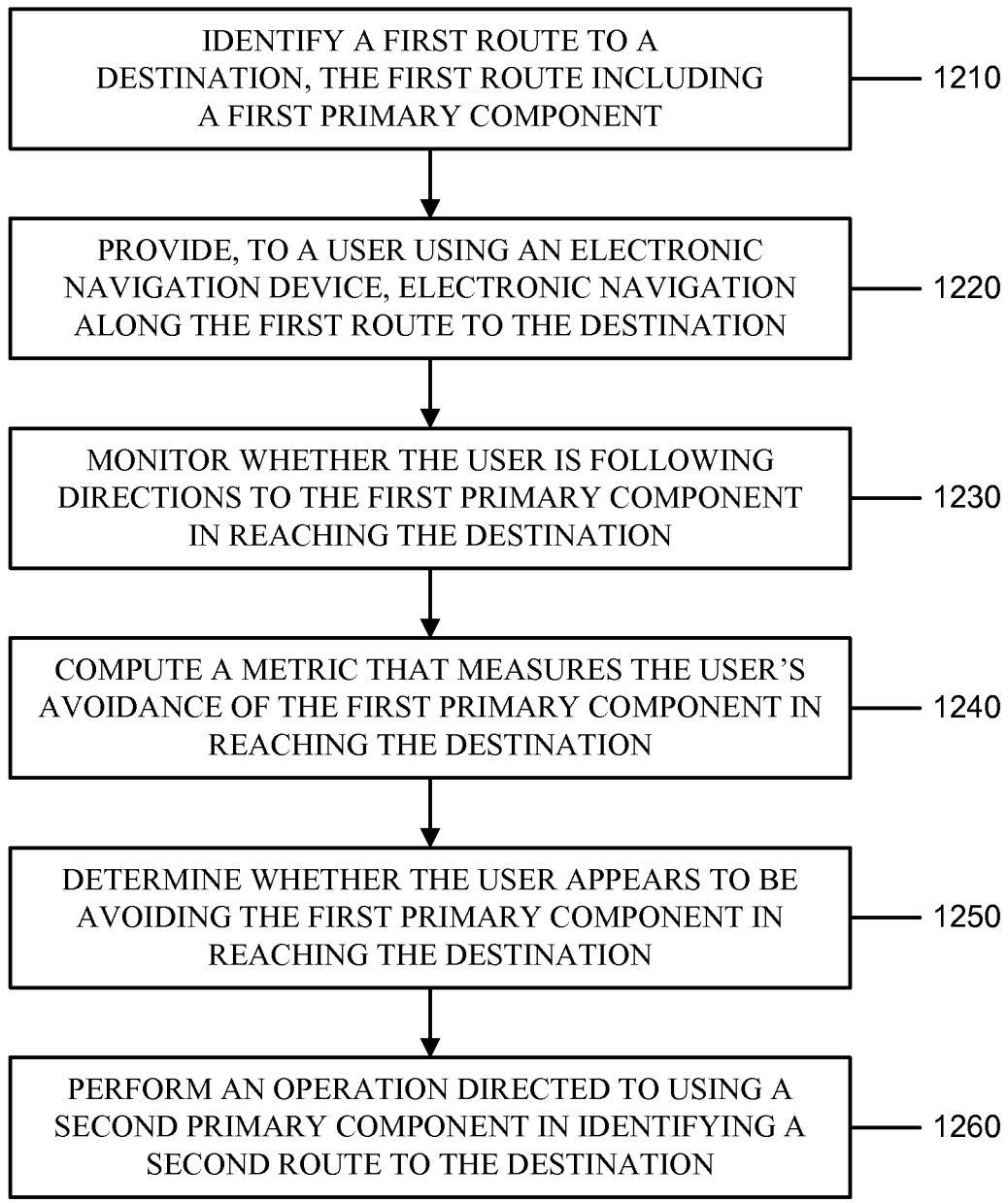
FIGS. 12-15 are flowcharts of example processes.

FIG. 12 illustrates an example of a process 1200 for controlling a navigation device. The operations of the process 1200 are described generally as being performed by the navigation system 1100. The operations of the process 1200 may be performed exclusively by the electronic navigation device 1105, may be performed exclusively by the navigation host 1190, or may be performed by a combination of the electronic navigation device 1105 and the navigation host 1190. In some implementations, operations of the process 1200 may be performed by one or more processors included in one or more electronic devices.

The navigation system 1100 identifies a first route to a destination that includes a first primary component (1210). For instance, the navigation system 1100 may receive user identifying a location to which a user wishes to travel. In response to the user input, the navigation system 1100 may determine the current position of the user's navigation device, access routing and mapping data, and identify a route to the destination based on current routing settings/preferences of the user. The first primary component of the first route may be one or more roads that represent a substantial portion of the first route (e.g., more than a threshold portion of the route). In one example, the first primary component may be a road that represents the largest portion of the first route to the destination.

The navigation system 1100 provides, to a user using an electronic navigation device, electronic navigation along the first route to the destination (1220). For example, the navigation system 1100 may provide turn-by-turn directions to the user to enable the user to follow the first route to the destination. In this example, the navigation system 1100 may output turn-by-turn directions to the user visually using a display device and/or audibly using a speaker.

Providing electronic navigation may include re-routing the user to the first primary component based on the user diverging from the first route and the first primary component remaining a part of a preferred route to the destination according to routing settings at the time of the re-routing. For instance, the navigation system 1100 may track the position of the navigation device and determine whether the user has diverged from the first route. When the navigation system 1100 determines that the user has diverged from the first route, the navigation system 1100 may determine whether the first route remains preferred according to current routing settings and/or whether the first primary component remains a part of a preferred route to the destination according to current routing settings. When the first route/first primary component remains preferred, the navigation system 1100 may identify a route between the current position of the navigation device and the first primary component and use the navigation device to provide electronic navigation along the route between the current position of the navigation device and the first primary component to re-route the user to the first primary component. As discussed throughout the disclosure, a decision to re-route the user to the first primary component may be overridden by a determination that the user appears to be avoiding the first primary component.

The navigation system 1100 monitors whether the user is following directions to the first primary component in reaching the destination (1230). For instance, the navigation system 1100 may track the position of the navigation device and determine whether the user has diverged from the first primary component or diverged from a path that leads to the first primary component. The navigation system 1100 may track when the user diverges from the first primary component or from a path that leads to the first primary component. The navigation system 1100 also may track and identify instances in which the user has not followed a direction provided by the electronic navigation device in reaching the destination using the first primary component. In some examples, the navigation system 1100 may store, in electronic storage, tracking data that reflects user avoidance of the first primary component.

The navigation system 1100 computes a metric that measures the user's avoidance of the first primary component in reaching the destination (1240). The navigation system 1100 may compute a metric that measures the user's avoidance of the first primary component based on the monitoring of whether the user is following directions to the first primary component in reaching the destination (e.g., based on tracking data that reflects user avoidance of the first primary component stored in electronic storage). The metric may measure the number of times the user has not followed a direction provided by the electronic navigation device in reaching the destination using the first primary component and may account for other characteristics of a user diverging from the first primary component or a path that leads to the first primary component. For example, computing the metric that measures the user's avoidance of the first primary component in reaching the destination may use approaches described below with respect to FIGS. 13 and 14.

The navigation system 1100 determines whether the user appears to be avoiding the first primary component in reaching the destination (1250). For instance, the navigation system automatically, without user intervention, determines whether the user appears to be avoiding the first primary component in reaching the destination based on the computed metric that measures the user's avoidance of the first primary component in reaching the destination. The navigation system 1100 may compare the computed metric to a threshold level of avoidance and, based on the comparison, determine whether the level of avoidance measured by the computed metric exceeds the threshold level of avoidance. When the level of avoidance measured by the computed metric exceeds the threshold level of avoidance, the navigation system 1100 determines that the user appears to be avoiding the first primary component in reaching the destination. When the level of avoidance measured by the computed metric is less than the threshold level of avoidance, the navigation system 1100 determines that the user does not appear to be avoiding the first primary component in reaching the destination (e.g., the user's level of avoidance of the first primary component is not large enough to determine that the user is avoiding the first primary component).

In response to a determination that the user appears to be avoiding the first primary component in reaching the destination, the navigation system 1100 performs an operation directed to using a second primary component in identifying a second route to the destination (1260). For example, the navigation system 1100 automatically, without user intervention, controls the electronic navigation device to perform an operation directed to using a second primary component in identifying a second route to the destination. In this example, the navigation system 1100 controls the electronic navigation device to perform an operation directed to using a second primary component in identifying a second route to the destination despite the first primary component remaining a part of a preferred route to the destination according to routing settings at the time of the controlling.

In some implementations, the navigation system 1100 determines that the first primary component remains a part of a preferred route to the destination according to routing settings at the time of the controlling, and overrides the determination that the first primary component remains a part of a preferred route to the destination based on the determination that the user appears to be avoiding the first primary component in reaching the destination. In these implementations, the navigation system 1100 may override a decision to re-route the user to the first primary component and, instead, perform an operation directed to using a second primary component that is different than the first primary component in identifying a second route to the destination.

The navigation system 1100 may perform an operation directed to using a second primary component in identifying a second route to the destination by using any of the techniques (or combinations of the techniques) described above with respect to FIG. 1-10. For example, the navigation system 1100 may automatically, without user intervention, identify a second route to the destination that includes a second primary component that is different than the first primary component and intentionally avoids the first primary component. In this example, the navigation system 1100 may automatically, without user invention, change the current route to the second route that includes the second primary component when providing electronic navigation to the destination. The change may occur despite the first primary component remaining a part of a preferred route to the destination according to current routing settings.

In some examples, in response to automatically, without user invention, changing to the second route that includes the second primary component when providing electronic navigation to the destination, the navigation system 1100 may display (or otherwise output) a notification message that indicates that a prior route has been automatically changed based on the user's avoidance of the prior route. The notification message may further indicate that the prior route remains a preferred route to the destination according to current routing settings. The navigation system 1100 may enable the user to switch back to the prior route based on the user perceiving the notification message.

In some implementations, the navigation system 1100 displays (or otherwise outputs) a suggestion message that suggests identifying an alternative route to the destination that uses an alternative primary component in reaching the destination. The navigation system 1100 may display, concurrently with or subsequent to the suggestion message, one or more user interface controls that enable the user to either control the electronic navigation device to pursue an alternative route to the destination that uses an alternative primary component in reaching the destination or control the electronic navigation device to maintain a route to the destination that uses the first primary component in reaching the destination. The suggestion message may further include a portion indicating that a current route to the destination that uses the first primary component in reaching the destination is preferred to the alternative route according to the current routing settings.

In further implementations, the navigation system 1100 displays (or otherwise outputs) a suggestion message that indicates that the user appears to be avoiding the first primary component and that suggests avoiding the first primary component in identifying an alternative route to the destination that uses an alternative primary component. The navigation system 1100 may display, concurrently with or subsequent to the suggestion message, one or more user interface controls that enable the user to either control the electronic navigation device to pursue an alternative route that avoids the first primary component or control the electronic navigation device to maintain a route to the destination that uses the first primary component in reaching the destination.

The navigation system 1100 also may identify a second route to the destination that uses a second primary component in reaching the destination based on routes the user is following in avoiding the first primary component in reaching the destination. For instance, the navigation system may compare the routes the user is following in avoiding the first primary component to other potential primary components of routes to the destination and, based on the comparison, identify one of the other potential primary components the user appears to be following. When the navigation system 1100 identifies a second primary component that the user appears to be following, the navigation system 1100 may display a suggestion message that indicates that the user appears to prefer the second primary component to the first primary component in reaching the destination and that suggests using the second route to the destination that uses the second primary component in reaching the destination. The navigation system 1100 may display, concurrently with or subsequent to the suggestion message, one or more user interface controls that enable the user to either control the electronic navigation device to pursue the second route that uses the second primary component in reaching the destination or control the electronic navigation device to maintain a route to the destination that uses the first primary component in reaching the destination.

The navigation system 1100 further may display a suggestion message that suggests a change in the routing settings used in identifying the preferred route to the destination. The navigation system 1100 may display, concurrently with or subsequent to the suggestion message, one or more user interface controls that enable the user to change the routing settings used in identifying the preferred route to the destination. In response to the user determining to change the routing settings, the navigation system may identify a preferred route to the destination using the changed routing settings and change the route used in providing electronic navigation to the destination if appropriate.

In displaying the suggestion message that suggests a change in the routing settings used in identifying the preferred route to the destination, the navigation system 1100 may analyze the routing settings to determine whether a change in a particular routing setting results in a different preferred route to the destination that does not include the first primary component. For instance, the navigation system 1100 may change each routing setting (or each value for each routing setting), identify a preferred route to the destination for each changed routing setting, and determine whether the identified route to the destination for each changed routing setting differs from the current route preferred under the current routing settings. Based on the analysis, the navigation system 1100 may identify a subset of the routing settings for which a change results in a different preferred route to the destination that does not include the first primary component, and then display the identified subset of the routing settings. The navigation system 1100 may display only the identified subset of the routing settings for which a change results in a different preferred route to the destination that does not include the first primary component to enable the user to consider only those settings that would change the current route the user appears to be avoiding.

The navigation system 1100 also may analyze characteristics of the routes the user is following in avoiding the first primary component and identify a particular routing setting to suggest that the user changes. The navigation system 1100 may identify a particular routing setting to suggest by comparing the characteristics of the routes the user is actually following and characteristics of the first primary component and identifying characteristics that differ. The navigation system 1100 may identify a routing setting to suggest that the user change based on the characteristics that differ between the routes the user is actually following and the first primary component. For instance, when the first primary component includes a highway and routes the user is actually following do not include highways, the navigation system 1100 may suggest changing an "avoid highways" setting from a "no" setting to a "yes" setting.

In some examples, the navigation system 1100 may automatically, without human intervention, change the routing settings of the user and identify an alternative route using the changed routing settings. In determining which setting to change and how to change the setting, the navigation system 1100 may analyze characteristics of routes the user is following in avoiding the first primary component and select, based on the analysis, a routing setting that reflects differences in the characteristics of the first primary component and the routes the user is actually following. For instance, if the user's routing settings indicate that highways are to be avoided, the first primary component does not include highways, and the user is following a highway in avoiding the first primary component, the navigation system 1100 may automatically, without human intervention, change the routing settings to indicate that highways should not be avoided or that highways should be preferred.

Figure 13:
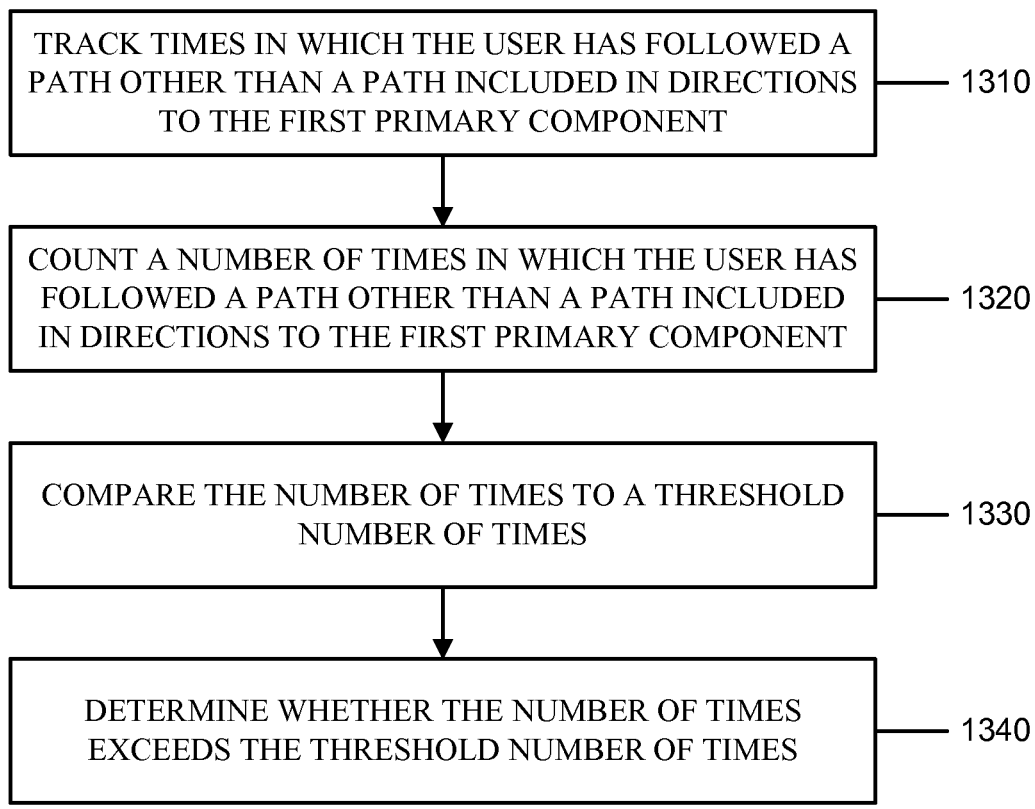

FIG. 13 illustrates an example of a process 1300 for determining whether a user appears to be avoiding a road or a route in reaching a destination. The operations of the process 1300 are described generally as being performed by the navigation system 1100. The operations of the process 1300 may be performed exclusively by the electronic navigation device 1105, may be performed exclusively by the navigation host 1190, or may be performed by a combination of the electronic navigation device 1105 and the navigation host 1190. In some implementations, operations of the process 1300 may be performed by one or more processors included in one or more electronic devices.

The navigation system 1100 tracks times in which the user has followed a path other than a path included in directions to the first primary component (1310). For example, the navigation system 1100 monitors the position of the navigation device, compares the position of the navigation device to a path that includes the first primary component, and determines whether movement of the navigation device is following the path. In this example, the navigation system 1100 may track each time the navigation device diverges from the path or does not follow a direction provided by the navigation device. The tracking may include directions that re-route the user to the first primary component and tracking times in which the user has avoided re-routing directions.

The navigation system 1100 counts a number of times in which the user has followed a path other than a path included in directions to the first primary component (1320). The navigation system 1100 may count the number of times in which the user has followed a path other a path that includes the first primary component based on the tracking. For instance, the navigation system 1100 may increment a counter (or store/update other data) each time the navigation system 1100 detects that the user has followed a path other than a path included in directions to the first primary component (e.g., the user has diverged from a path that includes the first primary component or avoided a direction routing the user to the first primary component). The counting may include directions that re-route the user to the first primary component and the navigation system may count times in which the user has avoided re-routing directions.

The navigation system 1100 compares the number of times to a threshold number of times (1330). The navigation system 1100 may access a threshold number of times and compare the threshold number of times to the number of times in which the user has followed a path other than a path included in directions to the first primary component. The threshold number of times may be configurable by a user. For instance, a first user may routinely miss directions provided by the navigation device and decide to set the configurable threshold to a relatively high number of times. In this regard, the navigation device may not determine that the first user is avoiding the first primary component until the first user has followed a path other than a path included in directions to the first primary component several times. In another example, a second user may follow directions provided by the navigation device very well and decide to set the configurable threshold to a relatively low number of times. In this regard, the navigation device may determine that the second user is avoiding the first primary component once the user has followed a path other than a path included in directions to the first primary component a few times or even a single time.

In some implementations, the navigation system 1100 may automatically set the configurable threshold for the user. In these implementations, the navigation system 1100 may monitor how often the user accurately follows directions provided by the navigation device based on the users past activity. Based on the monitoring, the navigation system 1100 may assess the user's ability to follow directions and set the configurable threshold accordingly (e.g., the navigation system 1100 may set the configurable threshold relatively low for a user that follows directions well and the navigation system 1100 may set the configurable threshold relatively high for a user that follows directions poorly). The navigation system 1100 also may consider other factors in setting the configurable threshold such as the number of times a user accepts the navigation system's 1100 suggestion to identify an alternative route or change routing settings (e.g., the navigation system 1100 may increase the threshold when the user declines suggestions frequently or may decrease the threshold when the user accepts suggestions frequently).

The navigation system 1100 determines whether the number of times exceeds the threshold number of times (1340). Based on the comparison of the threshold number of times to the number of times in which the user has followed a path other than a path included in directions to the first primary component, the navigation system 1100 determines whether the number of times exceeds the threshold (or equals the threshold). When the number of times exceeds (or equals) the threshold, the navigation system 1100 may determine that the user is avoiding the first primary component and take action accordingly.

Figure 14:
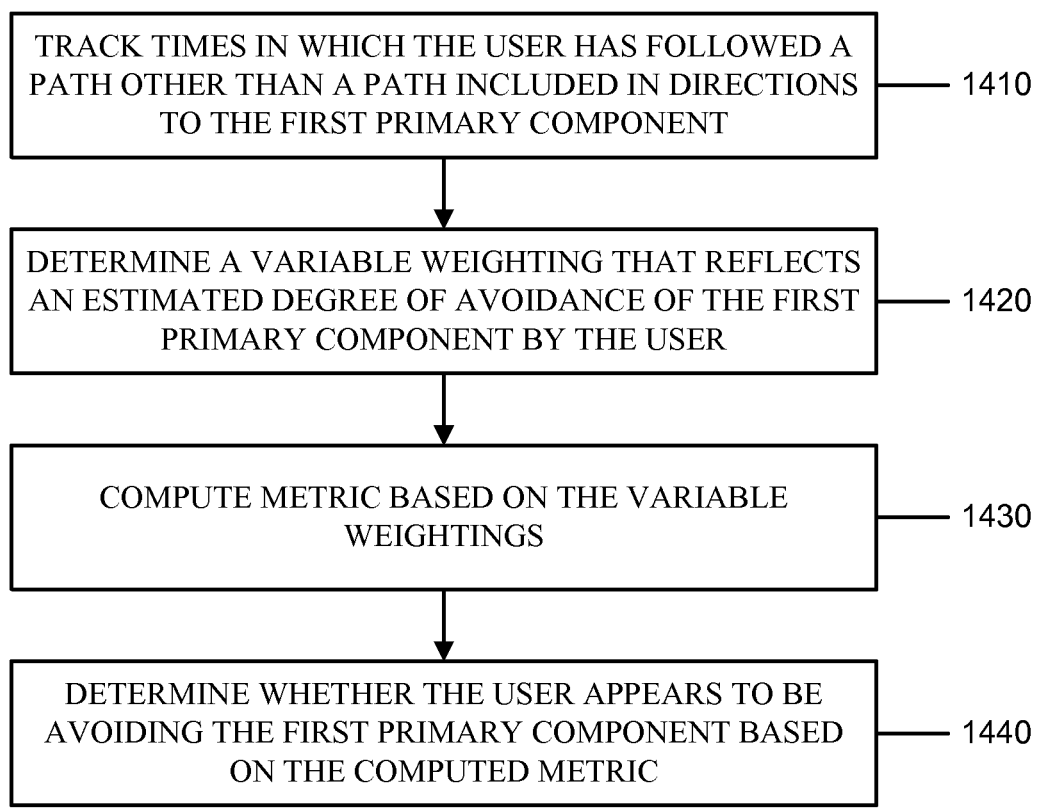

FIG. 14 illustrates an example of a process 1400 for determining whether a user appears to be avoiding a road or a route in reaching a destination. The operations of the process 1400 are described generally as being performed by the navigation system 1100. The operations of the process 1400 may be performed exclusively by the electronic navigation device 1105, may be performed exclusively by the navigation host 1190, or may be performed by a combination of the electronic navigation device 1105 and the navigation host 1190. In some implementations, operations of the process 1400 may be performed by one or more processors included in one or more electronic devices.

The navigation system 1100 tracks times in which the user has followed a path other than a path included in directions to the first primary component (1410). For example, the navigation system 1100 monitors the position of the navigation device, compares the position of the navigation device to a path that includes the first primary component, and determines whether movement of the navigation device is following the path. In this example, the navigation system 1100 may track each time the navigation device diverges from the path or does not follow a direction provided by the navigation device. The tracking may include directions that re-route the user to the first primary component and tracking times in which the user has avoided re-routing directions.

The navigation system 1100 determines a variable weighting that reflects an estimated degree of avoidance of the first primary component by the user (1420). For instance, rather than merely tracking times in which the user has followed a path other than a path included in directions to the first primary component, the navigation system 1100 assesses circumstances surrounding a time in which the user has followed a path other than a path included in directions to the first primary component and assigns a variable weighting to the instance of divergence from the path. The variable weighting may reflect an estimated degree of avoidance of the first primary component by the user. The navigation system 1100 may determine the variable weighting depending on many circumstances surrounding the instance of divergence from the path.

For example, the navigation system 1100 may determine whether the path other than the path included in directions to the first primary component is in a direction toward the first primary component. When the path is in a direction toward the first primary component, the navigation system may determine a relatively lower variable weighting because the divergence from the path may not indicate that the user is avoiding the first primary component because the user is still traveling in the direction of the first primary component. When the path is in a direction away from the first primary component, the navigation system may determine a relatively higher variable weighting because the divergence from the path may provide a better indication that the user is avoiding the first primary component because the user is traveling away from the first primary component.

In some implementations, the navigation system 1100 determines an amount of time between when the directions to the first primary component were provided and when the user followed the path other than the path included in directions to the first primary component. The navigation system 1100 may determine the variable weighting based on the amount of time between when the directions to the first primary component were provided and when the user followed the path other than the path included in directions to the first primary component. For instance, the navigation system 1100 may determine a relatively higher variable weighting when the amount of time is greater because the divergence is less likely to have been caused by the user failing to perceive the directions or not having time to react to the directions. Moreover, the navigation system 1100 may determine a relatively lower variable weighting when the amount of time is lower because the divergence is more likely to have been caused by the user failing to perceive the directions or not having time to react to the directions.

The navigation system 1100 also may consider driving characteristics associated with the divergence from the route in determining a variable weighting. For example, the navigation system 1100 may determine a variable weighting based on whether the direction (e.g., turn) missed by the user is an often missed direction (e.g., determine a relatively lower variable weighting when the direction is often missed).

In addition, the navigation system 1100 may consider whether the driving of the user prior to missing the direction appears to suggest that the user intentionally avoided the direction or missed the direction by accident. For instance, the navigation system 1100 may determine a relatively lower variable weighting when the user appears to have been changing lanes toward the missed direction and/or decelerating at the time of missing the direction. In contrast, the navigation system 1100 may determine a relatively higher variable weighting when the user appears to have been changing lanes away the missed direction and/or accelerating at the time of missing the direction.

In some examples, the navigation system 1100 may consider whether the path the user followed in diverging from the selected route is an alternative route to the first primary component. When the path is an alternative route to the first primary component, the navigation system may determine a relatively lower variable weighting because the divergence from the path may not indicate that the user is avoiding the first primary component because the user is traveling along a route to the first primary component although the route is not the one suggested by the navigation device. When the path is not an alternative route to the first primary component, the navigation system may determine a relatively higher variable weighting because the divergence from the path may provide a better indication that the user is avoiding the first primary component because the user is not traveling along a path to the first primary component.

Furthermore, the navigation system 1100 may consider whether the missed direction is a first missed direction or part of a string of missed directions in determining the variable weighting. The navigation system 1100 may assign a relatively lower variable weighting when the missed direction is a first missed direction and assign a relatively higher variable weighting when the missed direction is part of a series of missed directions (e.g., the navigation system 1100 may gradually increase the variable weighting as the number of missed directions increases).

The navigation system 1100 further may consider traffic conditions when determining the variable weighting. For instance, the navigation system 1100 may determine a relatively lower variable weighting when traffic conditions along the route the user traveled are better than traffic conditions along the selected route the user avoided. The navigation system 1100 also may determine a relatively higher variable weighting when traffic conditions along the route the user traveled are equal to or worse than traffic conditions along the selected route the user avoided.

The navigation system 1100 may delay assigning the variable weighting to examine driving behavior of the user after missing the direction. For instance, the navigation system 1100 may determine to assign a relatively lower variable weighting when the user appears to be making a U-turn or otherwise attempting to correct the missed direction. The navigation system 1100 also may determine to assign a relatively lower variable weighting when the user travels toward a point of interest in avoiding the selected route (e.g., when the user pulls into a gas station or a rest area, the navigation system 1100 determines that it is less likely that the user missed the direction because the user was avoiding the first primary component).

The navigation system 1100 computes a metric based on the variable weightings (1430). For instance, the navigation system 1100 may add together all of the variable weightings to determine a metric that estimates the user's avoidance of the first primary component. The computed metric may reflect an overall estimate of the user's avoidance of the first primary component by applying the variable weightings determined for each instance of divergence.

The navigation system 1100 determines whether the user appears to be avoiding the first primary component based on the computed metric (1440). For example, the navigation system 1100 may compare the computed metric to a threshold and determine whether the user appears to be avoiding the first primary component based on whether the computed metric exceeds (or equals) the threshold.

By using variable weightings, the navigation system 1100 may better estimate the user's actual avoidance of the first primary component. For instance, a relatively small number of highly-weighted missed directions (e.g., missed directions that appear intentional) may be needed for the navigation system 1100 to determine that the user is avoiding the first primary component. In addition, a relatively large number of low-weighted missed directions (e.g., missed directions that appear accidental) may be needed for the navigation system 1100 to determine that the user is avoiding the first primary component.

Figure 15:
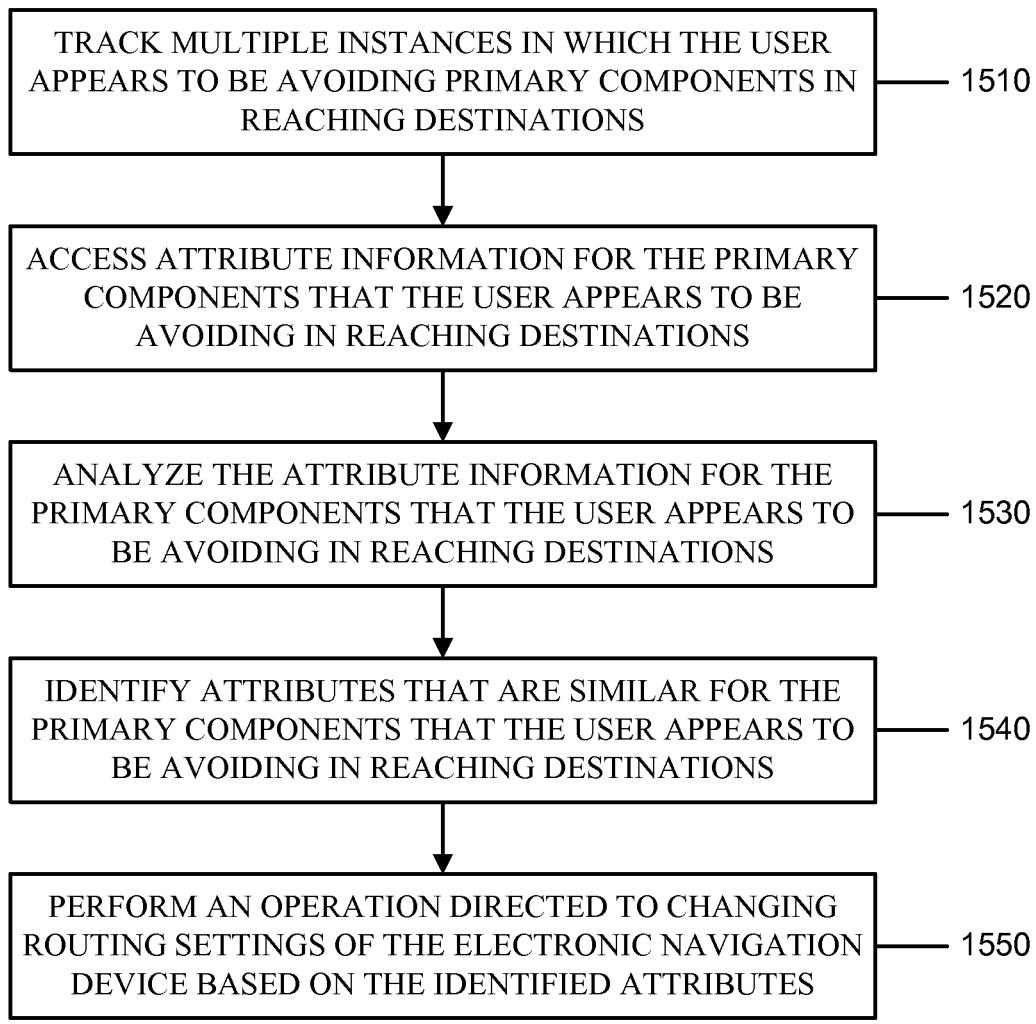

FIG. 15 illustrates an example of a process 1500 for determining whether a user appears to be avoiding a road or a route in reaching a destination. The operations of the process 1500 are described generally as being performed by the navigation system 1100. The operations of the process 1500 may be performed exclusively by the electronic navigation device 1105, may be performed exclusively by the navigation host 1190, or may be performed by a combination of the electronic navigation device 1105 and the navigation host 1190. In some implementations, operations of the process 1500 may be performed by one or more processors included in one or more electronic devices.

The navigation system 1100 tracks multiple instances in which the user appears to be avoiding primary components in reaching destinations (1510). For instance, the navigation system 1100 stores data each time the navigation system 1100 determines that the user appears to be avoiding a primary component and the user does not rebut this determination. The navigation system 1100 may store data that identifies the primary component the user avoided and the time when the user avoided the primary component.

The navigation system 1100 accesses attribute information for the primary components that the user appears to be avoiding in reaching destinations (1520). For example, the navigation system 1100 may access the data stored as part of tracking multiple instances in which the user appears to be avoiding primary components in reaching destinations. In this example, the navigation system 1100 may identify attribute information for the primary components the user has avoided from the accessed data or may identify the primary components the user has avoided from the accessed data and access attribute information for the identified primary components from another source (e.g., other electronic storage or another electronic device).

The navigation system 1100 analyzes the attribute information for the primary components that the user appears to be avoiding in reaching destinations (1530). The navigation system 1100 may compare the attribute information for the primary components the user has avoided and identify trends within the attribute information. The navigation system 1100 also may analyze the time information tracked by the navigation system 1100 and group attribute information of primary components avoided at similar time periods (e.g., the time periods morning, afternoon, and night, seasonal time periods spring, summer, fall, winter, or time periods last 60 days, last 180 days, last 360 days). Based on the time analysis, the navigation system 1100 may identify trends within particular time periods and also determine whether the user's preferences appear to be changing.

The navigation system 1100 identifies attributes that are similar for the primary components that the user appears to be avoiding in reaching destinations (1540). Based on the analysis, the navigation system 1100 identifies attributes that are often included in primary components the user has avoided. For instance, the navigation system 1100 may determine that the user tends to avoid routes that include highways or tends to avoid routes that minimize distance instead of time.

The navigation system 1100 performs an operation directed to changing routing settings of the electronic navigation device based on the identified attributes (1550). The navigation system 1100 may identify a particular routing setting that appears to be contrary to the user's routing preferences based on the identification of attributes that are similar for the primary components that the user appears to be avoiding in reaching destinations. For example, when the navigation system 1100 determines that the user tends to avoid routes that include highways, the navigation system 1100 may determine that the user prefers to avoid highways, but that the routing setting of "avoid highways" is set to "no." In this example, the navigation system may determine that the "avoid highways" routing setting does not match the user's preferences and may be a good candidate for a change. When the navigation system 1100 identifies a routing setting that is a good candidate for a change (e.g., the routing setting does not match the preference of the user inferred based on past route avoidance behavior of the user), the navigation device 1100 uses techniques described above to automatically, without human intervention, change the routing setting or automatically, without human intervention, suggest a change in the routing setting.

Although the operations of FIG. 15 have been described with respect to analyzing primary components that the user has avoided, the operations of FIG. 15 may be applied additionally or alternatively to routes the user has preferred in past routing situations. For example, the navigation system 1100 may track the primary components the user has preferred and may identify attributes that are similar for the primary components that the user has preferred in reaching destinations. The navigation system 1100 may use the identified attributes to infer preferences of the user and inform an operation directed to changing routing settings of the electronic navigation device. For instance, the navigation system 1100 may determine that the user often prefers routes that include highways and, based on the determination, identify that the "maximize highways" routing setting may be a good candidate for a change from a "no" setting to a "yes" setting.

In some implementations, the techniques described above may be applied in the context of identifying points of interest and providing electronic navigation to points of interest. In these implementations, a user may search for a point of interest, a navigation device may select a first point of interest in response to the search, and the navigation device may automatically, without human intervention, select a second point of interest in response to the search when the user appears to be avoiding the first point of interest.

Figure 16:
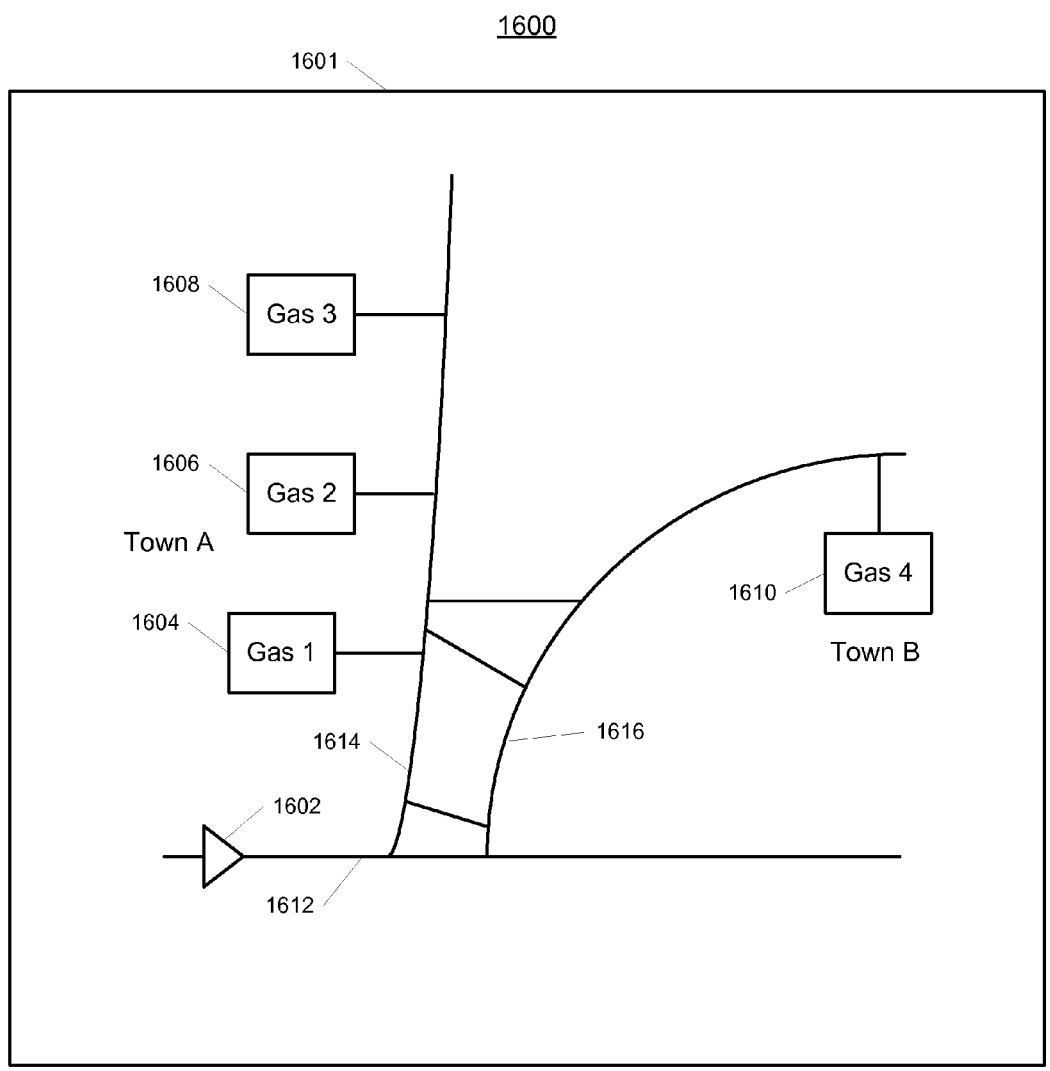
FIGS. 16-23 illustrate examples of user interfaces.

Referring to FIG. 16, a user interface 1600 of a navigation device includes a mapping display area 1601 that provides a display of a map of an area corresponding to a current position of a navigation device. The mapping display area 1601 may be similar to the mapping display area 101 described above with respect to FIG. 1.

The mapping display area 1601 also includes a current position indicator 1602. The current position indicator 1602 provides a graphical indication of the current position of the navigation device within the mapping display area 1601 and may be similar to the current position indicator 106 described above with respect to FIG. 1.

The mapping display area 1601 further includes multiple points of interest 1604, 1606, 1608, and 1610. The multiple points of interest 1604, 1606, 1608, and 1610 may be identified by the navigation device in response to a search for a point of interest. For instance, as shown in FIG. 16, the multiple points of interest 1604, 1606, 1608, and 1610 may be gas stations and the navigation device may select and provide electronic navigation to one of the multiple points of interest 1604, 1606, 1608, and 1610 when a user submits, to the navigation device, a search request for a gas station.

As shown in FIG. 16, based on the current position of the navigation device, the user may travel to the multiple points of interest 1604, 1606, and 1608 by following a route that includes road 1612 and road 1614 and may travel to the point of interest 1610 by following a route that includes road 1612 and road 1616. In the example shown in FIG. 16, the primary component of a route to the multiple points of interest 1604, 1606, and 1608 may be identified as the road 1614 and the primary component of a route to the point of interest 1610 may be identified as the road 1616.

The navigation device may select the point of interest 1604 in response to the user's search for a gas station because the point of interest 1604 is the closest gas station to the user's current position. Based on the selection of the point of interest 1604, the navigation device provides electronic navigation to the point of interest 1604 along the route that includes the road 1612 and the road 1614. For instance, the navigation device provides a direction to the user to turn left onto the road 1614.

Figure 17:
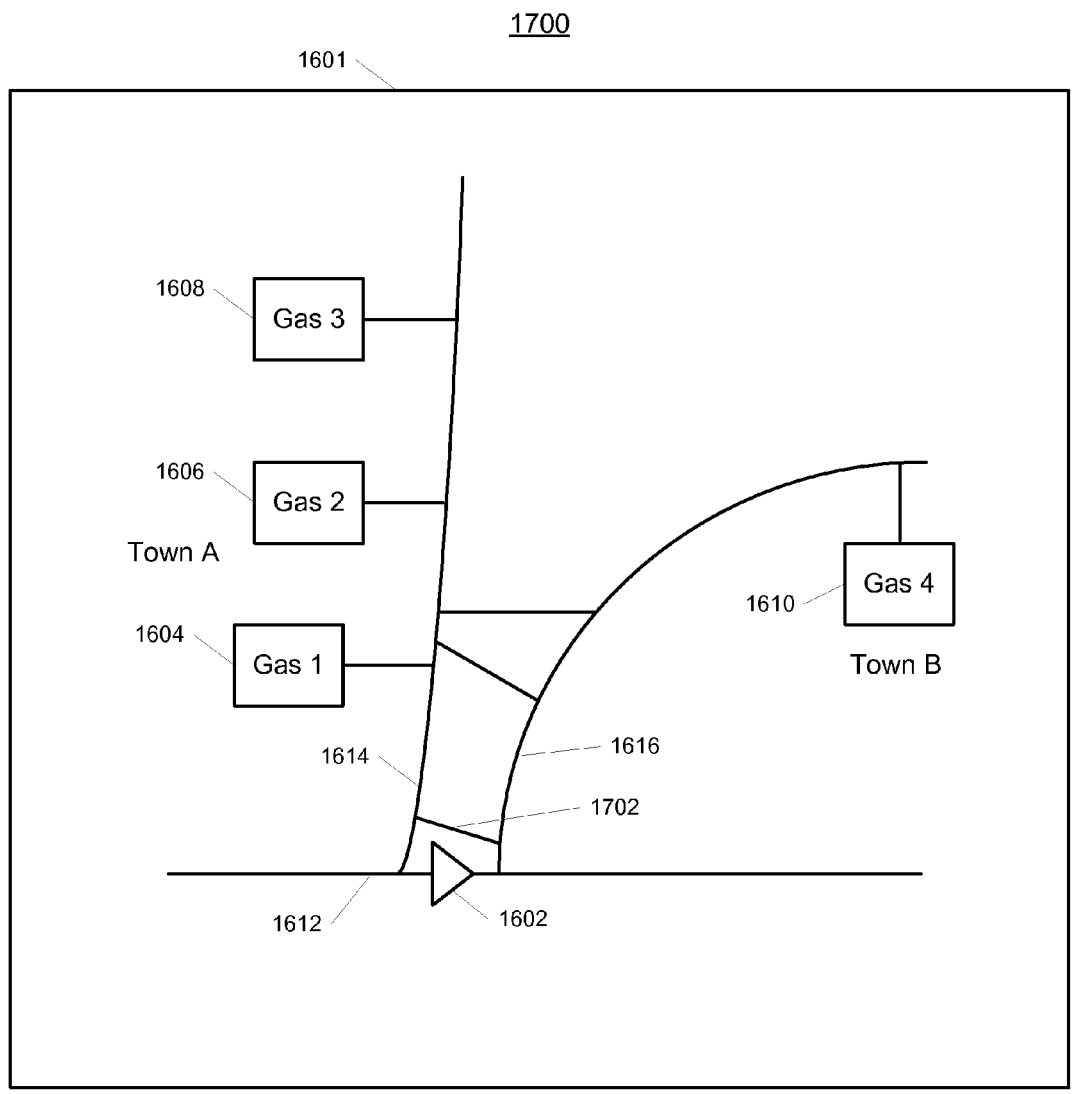

Referring to FIG. 17, a user interface 1700 illustrates the mapping display area 1601 at a time subsequent to a time when the user interface 1600 was shown. In the user interface 1700, the current position indicator 1602 shows the current position of the navigation device as being on the road 1612 between the road 1614 and the road 1616. As shown, the user has traveled past the road 1614 and, thereby, diverged from the primary component of the preferred route to the point of interest 1604. The user may have intentionally avoided the road 1614 (e.g., the user may have ignored directions to turn left on the road 1614) or may have accidentally missed the road 1614.

Based on the user diverging from the primary component of the preferred route to the point of interest 1604, the navigation device re-routes the user to the primary component of the preferred route to the point of interest 1604. For instance, the navigation device identifies a route that includes the road 1616 and the road 1702 as being the preferred route to return to the primary component (e.g., the road 1614). The navigation device also tracks the divergence as the first instance of the user avoiding the primary component (e.g., the road 1614) of the route to the point of interest 1604. Because only a first instance of the user avoiding the primary component is less than a threshold level of avoidance, the navigation device re-routes to the user to the primary component of the preferred route to the point of interest 1604.

Figure 18:
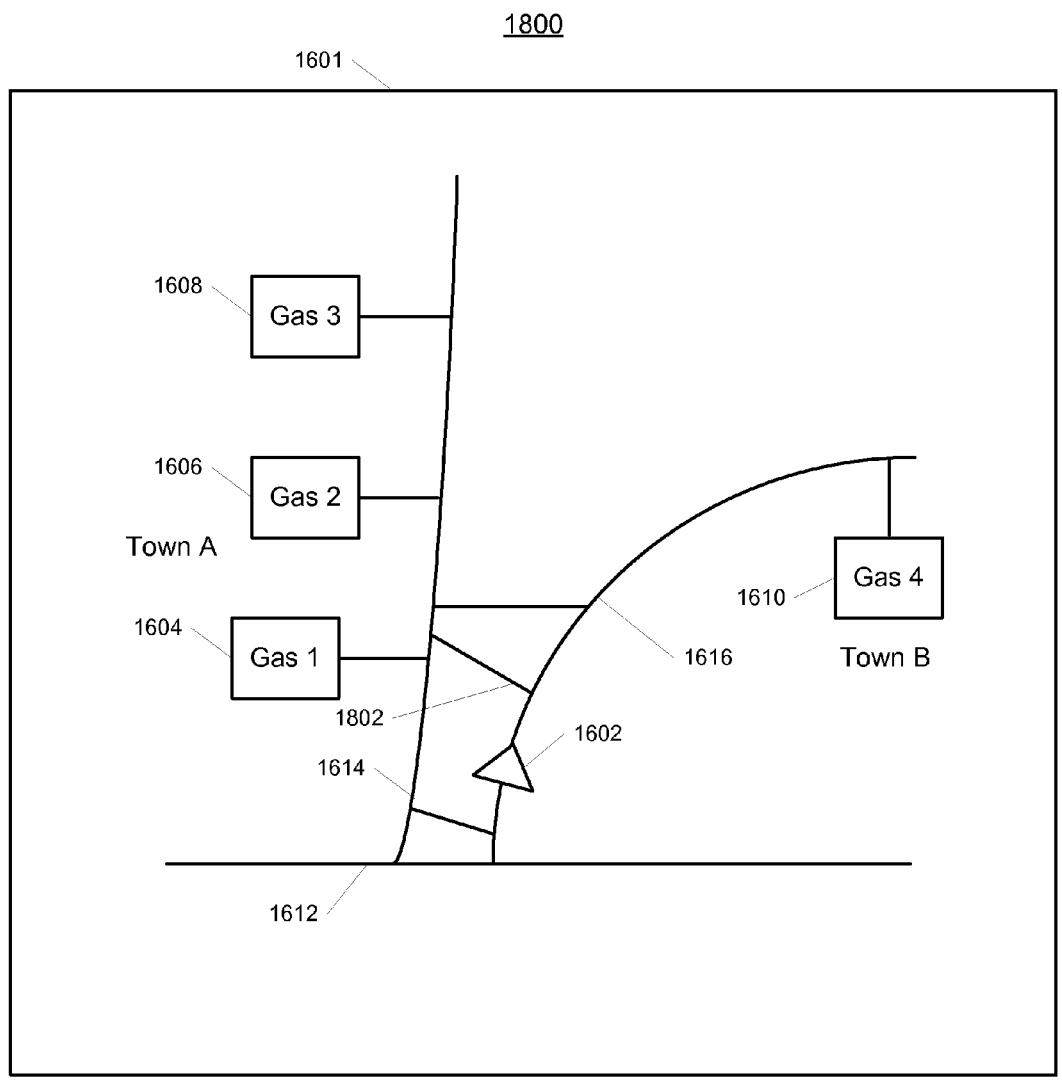

Referring to FIG. 18, a user interface 1800 illustrates the mapping display area 1601 at a time subsequent to a time when the user interface 1700 was shown. In the user interface 1800, the current position indicator 1602 shows the current position of the navigation device as being on the road 1616 between the road 1702 and the road 1802. As shown, the user has traveled past the road 1702 and, thereby, diverged from the re-routing path to the primary component (e.g., the road 1614) of the preferred route to the point of interest 1604. The user may have intentionally avoided the road 1702 (e.g., the user may have ignored directions to turn left on the road 1702) or may have accidentally missed the road 1702.

Based on the user further diverging from the primary component of the preferred route to the point of interest 1604 and the point of interest 1604 remaining closest to the user's current position, the navigation device re-routes the user to the primary component of the preferred route to the point of interest 1604. For instance, the navigation device identifies a route that includes the road 1802 as being the preferred route to return to the primary component. The navigation device also tracks the divergence as the second instance of the user avoiding the primary component (e.g., the road 1614) of the route to the point of interest 1604. Because only two instances of the user avoiding the primary component is less than a threshold level of avoidance, the navigation device re-routes the user to the primary component of the preferred route to the point of interest 1604.

Figure 19:
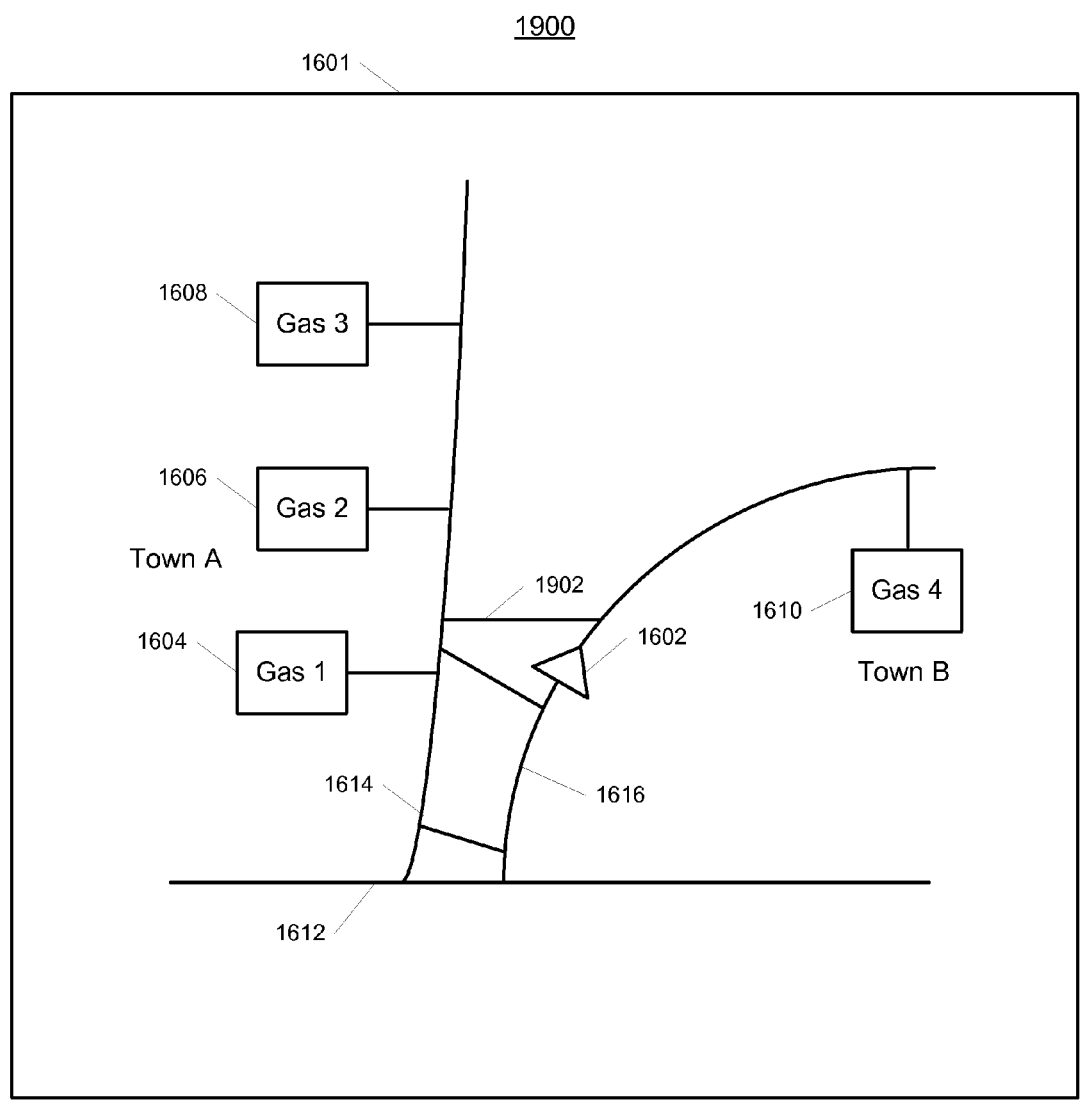

Referring to FIG. 19, a user interface 1900 illustrates the mapping display area 1601 at a time subsequent to a time when the user interface 1800 was shown. In the user interface 1900, the current position indicator 1602 shows the current position of the navigation device as being on the road 1616 between the road 1802 and the road 1902. As shown, the user has traveled past the road 1802 and, thereby, diverged from the re-routing path to the primary component of the preferred route to the point of interest 1604. The user may have intentionally avoided the road 1802 (e.g., the user may have ignored directions to turn left on the road 1802) or may have accidentally missed the road 1802.

Based on the user further diverging from the primary component of the preferred route to the point of interest 1604, the navigation device tracks the divergence as the third instance of the user avoiding the primary component (e.g., the road 1614) of the route to the point of interest 1604. In response to identifying the current divergence from the primary component of the route to the point of interest 1604 as being the third instance of divergence, the navigation device automatically, without user intervention, determines that the user appears to be avoiding the point of interest 1604. Based on the determination that the user appears to be avoiding the point of interest 1604, the navigation device automatically, without human intervention, identifies an alternative point of interest without re-routing to the primary component (e.g., the road 1614) despite the point of interest 1604 remaining the closest of the multiple points of interest to the current position of the navigation device.

For instance, as shown in FIG. 19, the navigation device automatically, without human intervention, identifies the point of interest 1610 as the preferred alternative route to the destination 104. The navigation device identifies the point of interest 1610 as being the preferred alternative point of interest because it is the closest of the multiple points of interest to the current position of the navigation device that does not include the primary component (e.g., the road 1614) the navigation device has determined the user is avoiding in reaching the point of interest. In this regard, although the point of interest 1606 is closer to the current position of the navigation device, the point of interest 1610 is selected as the alternative point of interest because traveling to the point of interest 1606 requires the user to travel on the primary component (e.g., the road 1614) the navigation device has determined the user is avoiding in reaching the point of interest.

The user interface 1900 may include a notification message that indicates that the prior point of interest is being automatically changed and that indicates that the prior point of interest remains preferred. In some implementations, the notification message may identify the primary component (e.g., the road 1614) that the navigation device determined that the user is avoiding and indicate that the automatic change in the point of interest is based on the user's avoidance of the primary component (e.g., the road 1614).

In some implementations, instead of automatically changing the point of interest, the navigation device may suggest a change in the point of interest in response to a determination that the user appears to be avoiding the point of interest 1604. In these implementations, the user may provide user input that indicates whether the user wishes to change the point of interest and also may provide user input related to identifying the alternative point of interest to better identify the user's preference.

Figure 20:
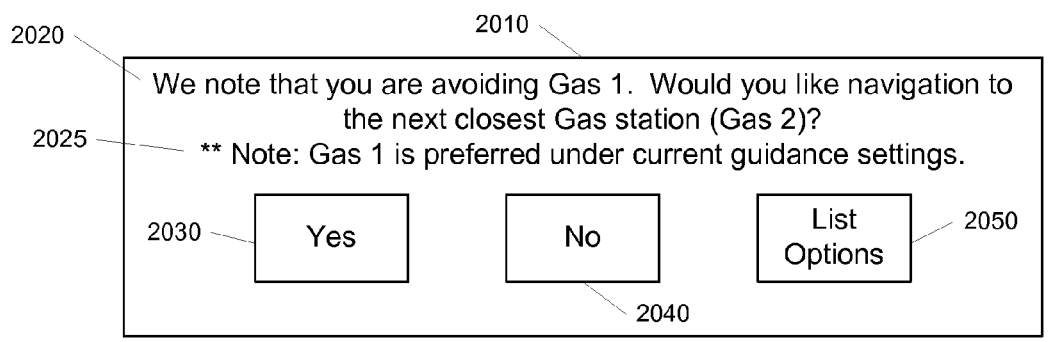

Referring to FIG. 20, a user interface includes a suggestion message 2010 that includes a suggestion portion 2020 and an informational portion 2025. The suggestion portion 2020 indicates that the navigation device has determined that the user appears to be avoiding the point of interest 1604 (i.e., Gas 1) and asks the user whether the user would like to find an alternative point of interest. In the example shown in FIG. 20, the navigation device identifies the next closest point of interest (i.e., Gas 2) and displays the next closest point of interest in the suggestion portion 2020 to facilitate the user's decision.

The informational portion 2025 provides a message to the user indicating that the point of interest 1604 (i.e., Gas 1) remains preferred under current guidance or routing settings (e.g., it remains the closest point of interest and current routing settings minimize distance in finding points of interest). The informational portion 2025 may inform the user's decision regarding whether to find an alternative point of interest 1604. The navigation device may automatically, without human intervention, display the suggestion message 2010 in response to a determination that the user appears to be avoiding the point of interest 1604.

The suggestion message 2010 also includes a "yes" user input control 2030 and a "no" user input control 2040. The "yes" user input control 2030 may be configured to receive user input from a user and, in response to user selection, initiate a process that causes the navigation device to identify an alternative point of interest and provide electronic navigation to the alternative point of interest. The "no" user input control 2040 may be configured to receive user input from a user and, in response to user selection, close the suggestion message 2010 and cause the navigation device to maintain the point of interest 1604 as preferred and continue providing electronic navigation to the point of interest 1604.

The suggestion message 2010 also includes a "list" user input control 2050. The "list" user input control 2050 may be configured to receive user input from a user and, in response to user selection, cause the navigation device to display a list of alternative points of interest. For example, in response to user selection of the "list" user input control 2050, the navigation device may display a list of other potential point of interest (e.g., the points of interest 1606, 1608, and 1610). In this example, the points of interest displayed in the list may be selectable by the user and, when the user selects a point of interest included in the list, the navigation device identifies a route to the selected point of interest and provides electronic navigation to the selected point of interest.

Figure 21:
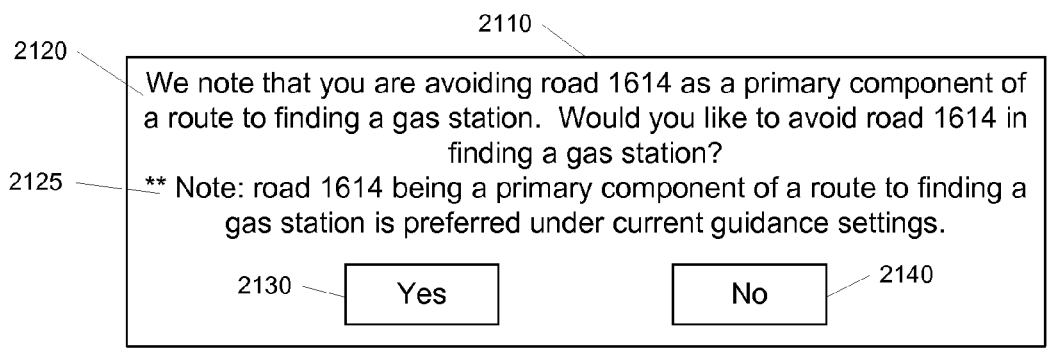

FIG. 21 illustrates another example of a suggestion message 2110 that the navigation device may automatically, without human intervention, display in response to a determination that the user appears to be avoiding the primary component of a route to the point of interest 1604 (i.e., Gas 1). The suggestion message 2110 includes a suggestion portion 2120 and an informational portion 2125. The suggestion portion 2120 indicates that the navigation device has determined that the user appears to be avoiding the road 1614 as a primary component in finding a gas station and asks the user whether the user would like to avoid the road 1614 in finding a gas station.

By specifically identifying the road 1614 as the primary component of a route the user appears to be avoiding, the suggestion message 2110 may inform the decision of the user and allow the user to more accurately express the user's intention. For instance, although the user may be avoiding a portion of the route to the point of interest 1604 (i.e., Gas 1), the portion being avoided by the user may not be the road 1614. Accordingly, the user may not wish to avoid the road 1614, but rather avoid another portion of the route. The navigation device may enable the user to identify the portion of the route the user is avoiding and may display a list of portions of the route and request that the user identify the portion of the route that the user is avoiding (or wishes to avoid in finding a gas station).

In some examples, instead of determining that the user is avoiding the point of interest 1604 (i.e., Gas 1), the navigation device determines that the user is avoiding the road 1614. In these examples, the navigation device may determine that the point of interest 1604 (i.e., Gas 1) remains the preferred point of interest, but find an alternative route to the point of interest 1604 (i.e., Gas 1) that avoids the road 1614.

The informational portion 2125 provides a message to the user indicating that the road 1614 remains a primary component of the route to the point of interest 1604 (i.e., Gas 1) preferred under current guidance or routing settings. The informational portion 2125 may inform the user's decision regarding whether to find an alternative route that avoids the road 1614.

The suggestion message 2110 also includes a "yes" user input control 2130 and a "no" user input control 2140. The "yes" user input control 2130 may be configured to receive user input from a user and, in response to user selection, initiate a process that causes the navigation device to identify a point of interest the user can reach with avoiding the road 1614 and provide electronic navigation to the identified point of interest along a route that avoids the road 1614. The "no" user input control 2140 may be configured to receive user input from a user and, in response to user selection, close the suggestion message 2110 and cause the navigation device to maintain the point of interest 1604 (i.e., Gas 1) and the route that includes the road 1614 as the preferred point of interest and route. As such, the navigation device continues to provide electronic navigation to the point of interest 1604 (i.e., Gas 1) along the route that includes the road 1614.

Figure 22:
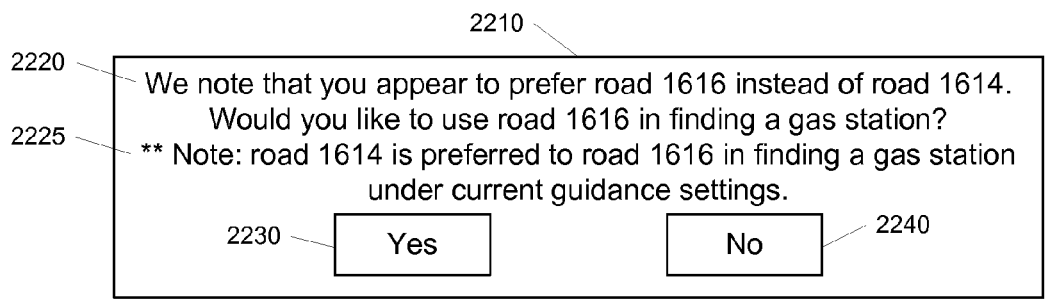

FIG. 22 illustrates another example of a suggestion message 2210 that the navigation device may automatically, without human intervention, display in response to a determination that the user appears to be avoiding the primary component of a route to the point of interest 1604 (i.e., Gas 1). In this example, in addition to determining that the user appears to be avoiding the primary component of the route to the point of interest 1604 (i.e., Gas 1), the navigation device also attempts to determine the primary component the user appears to be following in finding a point of interest. The navigation device may determine the primary component the user appears to be following in finding a point of interest by comparing the path the user has taken in traveling to a point of interest to possible routes to points of interest other than the point of interest 1604 (i.e., Gas 1) and, based on the comparison, may identify the route that most closely matches the path the user has taken in traveling in finding a point of interest.

The suggestion message 2210 includes a suggestion portion 220 and an informational portion 2225. The suggestion portion 2220 identifies the primary component that the navigation device determined the user appears to be following in finding a point of interest and allows the user to select that primary component to use in identifying a point of interest. For instance, the suggestion portion 2220 indicates that the navigation device has determined that the user appears to prefer the road 1616 to the road 1614 as a primary component of a route to a point of interest and asks the user whether the user would like to use the road 1616 as a primary component of a route to a point of interest. In implementations in which the navigation device automatically, without user intervention, changes the point of interest, the navigation device may account for a determination of the route the user appears to be following in finding a point of interest (e.g., using or applying a higher weight to the route the user appears to be following in finding a point of interest).

The informational portion 2225 provides a message to the user indicating that the road 1614 remains preferred to the road 1616 as a primary component of a route to a point of interest under current guidance or routing settings. The informational portion 2225 may inform the user's decision regarding whether to use the road 1616 as opposed to the road 1614 in finding a point of interest.

The suggestion message 2210 also includes a "yes" user input control 2230 and a "no" user input control 2240. The "yes" user input control 2230 may be configured to receive user input from a user and, in response to user selection, initiate a process that causes the navigation device to identify a route to a point of interest that uses the road 1616 and provide electronic navigation to the point of interest along the route that uses the road 1616. The "no" user input control 2240 may be configured to receive user input from a user and, in response to user selection, close the suggestion message 2210 and cause the navigation device to maintain the point of interest 1604 (i.e., Gas 1) and the route that includes the road 1614 as the preferred point of interest and route. As such, the navigation device continues to provide electronic navigation to the point of interest 1604 (i.e., Gas 1) along the route that includes the road 1614.

Figure 23:
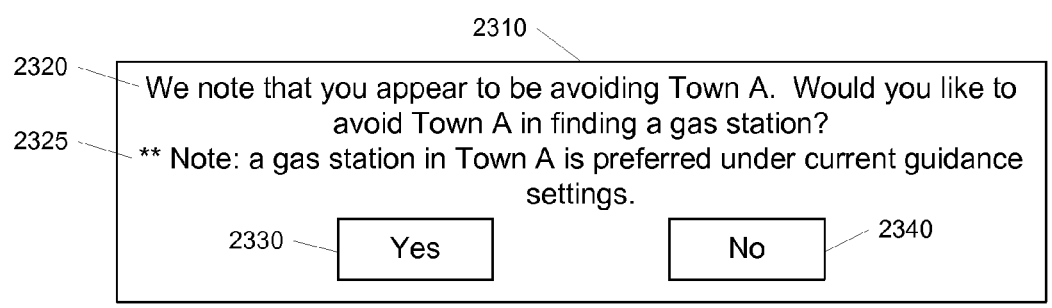

FIG. 23 illustrates another example of a suggestion message 2310 that the navigation device may automatically, without human intervention, display in response to a determination that the user appears to be avoiding the primary component of a route to the point of interest 1604 (i.e., Gas 1). The suggestion message 2310 includes a suggestion portion 2320 and an informational portion 2325. The suggestion portion 2320 indicates that the navigation device has determined that the user appears to be avoiding town A in finding a gas station and asks the user whether the user would like to avoid town A in finding a gas station.

By specifically identifying town A as the geographic attribute of the point of interest the user appears to be avoiding, the suggestion message 2310 may inform the decision of the user and allow the user to more accurately express the user's intention. The navigation device may identify that the user is avoiding town A based on avoidance of multiple points of interest in town A. For example, the navigation device may first determine that the user appears to be avoiding the point of interest 1604 (i.e., Gas 1) and identify the point of interest 1606 (i.e., Gas 2) as a preferred alternative point of interest. In this example, the navigation device may next determine that the user appears to be avoiding the point of interest 1606 (i.e., Gas 2) and identify the point of interest 1608 (i.e., Gas 3) as a preferred alternative point of interest. However, instead of selecting the point of interest 1608 (i.e., Gas 3), the navigation device may determine that the user has avoided two points of interest in town A and, therefore, determine to avoid town A in identifying a preferred alternative point of interest. Because the point of interest 1608 (i.e., Gas 3) is located in town A, the navigation device avoids the point of interest 1608 (i.e., Gas 3) and selects the point of interest 1610 (i.e., Gas 4) as the preferred alternative point of interest.

The informational portion 2325 provides a message to the user indicating that a point of interest in town A remains preferred under current guidance or routing settings. The informational portion 2325 may inform the user's decision regarding whether to avoid town A in finding a point of interest.

The suggestion message 2310 also includes a "yes" user input control 2330 and a "no" user input control 2340. The "yes" user input control 2330 may be configured to receive user input from a user and, in response to user selection, initiate a process that causes the navigation device to identify a point of interest that is not located in town A and provide electronic navigation to the identified point of interest. The "no" user input control 2340 may be configured to receive user input from a user and, in response to user selection, close the suggestion message 2310 and cause the navigation device to maintain the point of interest 1604 (i.e., Gas 1) and the route that includes the road 1614 as the preferred point of interest and route. As such, the navigation device continues to provide electronic navigation to the point of interest 1604 (i.e., Gas 1) along the route that includes the road 1614.

The user interfaces shown in FIGS. 20-23 may be displayed in any variety of combinations. For instance, all four of the interfaces may be displayed together or the user interface 2000 may be displayed first and one or all of the user interfaces 2100, 2200, and 2300 may be displayed when the user selects the "yes" user input control 2030. Some implementations may include other variations.

Figure 24:
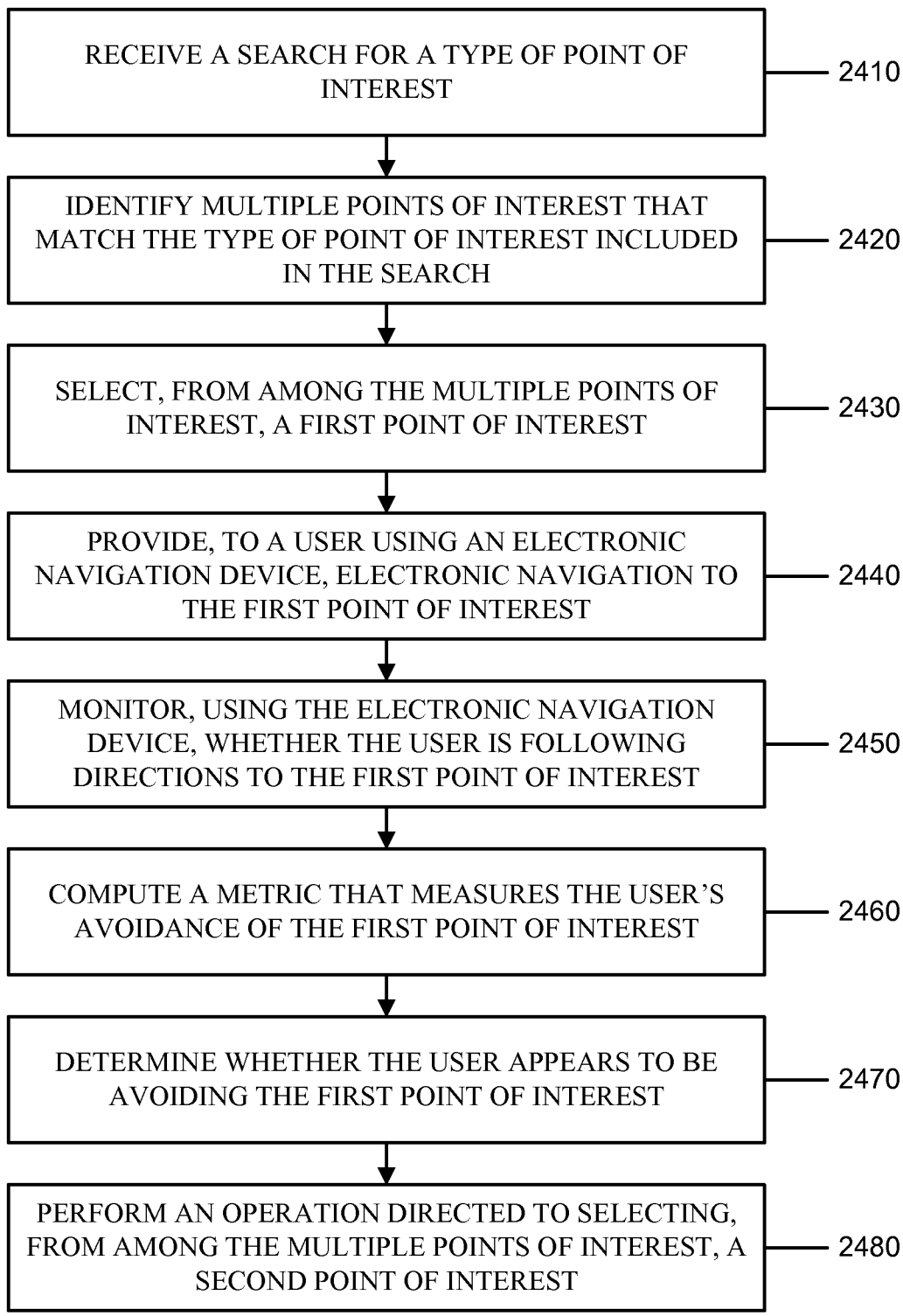
FIG. 24 is a flowchart of an example process.

FIG. 24 illustrates an example of a process 2400 for identifying a point of interest. The operations of the process 2400 are described generally as being performed by the navigation system 1100. The operations of the process 2400 may be performed exclusively by the electronic navigation device 1105, may be performed exclusively by the navigation host 1190, or may be performed by a combination of the electronic navigation device 1105 and the navigation host 1190. In some implementations, operations of the process 2400 may be performed by one or more processors included in one or more electronic devices.

The navigation system 1100 receives a search for a type of point of interest (2410). For instance, the navigation system 1100 may receive a query for a nearby restaurant, gas stations, etc.

The navigation system 1100 identifies multiple points of interest that match the type of point of interest included in the search (2420). For example, the navigation system 1100 searches a database (or other electronic storage) that includes information describing points of interest (e.g., type, location, ratings, etc.) and identifies points of interest that match the criteria requested by the user. In this example, the navigation system 1100 may identify gas stations within a particular geographic area with respect to the current position of the user (e.g., within a five mile radius of the user).

The navigation system 1100 selects, from among the multiple points of interest, a first point of interest (2430). For instance, the navigation system 1100 compares attributes of the identified multiple points of interest and selects a first point of interest based on the comparison and the user's preferences. The user's preferences may indicate that the user prefers to minimize distance and avoid highways. In this case, the navigation system 1100 selects the first point of interest as the closest point of interest that can be reached along a route that does not include a highway.

The navigation system 1100 provides, to a user using an electronic navigation device, electronic navigation to the first point of interest (2440). The navigation system 1100 may provide electronic navigation to the first point of interest using techniques described above with respect to reference numeral 1220.

The navigation system 1100 monitors, using the electronic navigation device, whether the user is following directions to the first point of interest (2450). The navigation system 1100 may monitor whether the user is following directions to the first point of interest using techniques described above with respect to reference numeral 1230.

The navigation system 1100 computes a metric that measures the user's avoidance of the first point of interest (2460). The navigation system 1100 may compute a metric that measures the user's avoidance of the first point of interest using techniques described above with respect to reference numerals 1240, 1320, and 1430.

The navigation system 1100 determines whether the user appears to be avoiding the first point of interest (2470). The navigation system 1100 may determine whether the user appears to be avoiding the first point of interest using techniques described above with respect to reference numerals 1250, 1340, and 1440.

The navigation system 1100 performs an operation directed to selecting, from among the multiple points of interest, a second point of interest (2480). The navigation system 1100 may perform an operation directed to selecting, from among the multiple points of interest, a second point of interest using techniques described above with respect to reference numeral 1260.

For example, the navigation system 1100 may automatically, without user intervention, identify a second point of interest and automatically, without user invention, change to the second point of interest despite the first point of interest remaining a preferred point of interest according to current routing settings. In this example, the navigation system 1100 may display a notification message that indicates that a prior point of interest has been changed based on the user's avoidance of the prior point of interest and that indicates that the prior point of interest remains a preferred point of interest according to current routing settings.

The navigation system 1100 also may automatically, without human intervention, display a suggestion message that suggests identifying an alternative point of interest in finding the type of point of interest searched for by the user. The navigation system 1100 further may display, concurrently with or subsequent to the suggestion message, one or more user interface controls that enable the user to either control the electronic navigation device to pursue the alternative point of interest or control the electronic navigation device to maintain the first point of interest.

In some implementations, the navigation system 1100 may identify a geographic attribute (e.g., a town) that the user appears to be avoiding in finding the type of point of interest searched for by the user. The first point of interest may have the geographic attribute. In these implementations, the navigation system 1100 may display a suggestion message that suggests avoiding the geographic attribute in finding the type of point of interest searched for by the user, and also may display, concurrently with or subsequent to the suggestion message, one or more user interface controls that enable the user to either control the electronic navigation device to avoid the geographic attribute in finding the type of point of interest searched for by the user or control the electronic navigation device to maintain the first point of interest that has the geographic attribute.

The user interfaces described with respect to FIGS. 1-10 and 16-23 may be rendered on a display device and at least one processor may be used to generate input to the display device to cause the display device to render the user interfaces. For instance, a portable electronic navigation device may include a processor and a display device. In operation of the portable electronic navigation device, the processor may be configured to generate one or more video signals that cause the display device to render a display of the user interfaces described above with respect to FIGS. 1-10 and 16-23.

The described techniques may be implemented using a navigation device (e.g., a personal navigation assistant, a portable navigation assistant, etc.). A navigation device may include any device that receives GPS signals for the purpose of determining a present location of the device. These devices may be used in military, commercial aviation, and consumer product applications. In some implementations, the navigation device may feature interactive street maps that also may show points of interest, route information, and step-by-step routing directions. These may be dedicated navigation devices or multi-function devices such as PDAs, smartphones, or laptop computers running GPS navigation software.

The described systems, methods, and techniques may be implemented in digital electronic circuitry, computer hardware, or in combinations of these elements and software. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method of providing electronic navigation comprising:
   identifying a first route to a destination, the first route including a first primary component that is part of the first route;
   providing, to a user using an electronic navigation device, electronic navigation along the first route to the destination including re-routing the user to the first primary component based on the user diverging from the first route and the first primary component remaining a part of a preferred route to the destination according to routing settings at the time of the rerouting;

based on the electronic navigation, monitoring, using the electronic navigation device, whether the user is following directions to the first primary component in reaching the destination, wherein the monitoring comprises tracking times in which the user has followed a path other than a path included in directions to the first primary component provided in the electronic navigation and the re-routing of the user to the first primary component;

based on the monitoring, computing a metric that measures the user's avoidance of the first primary component in reaching the destination, wherein computing the metrics comprises:

for each time in which the user has followed a path other than a path included in directions to the first primary component, determining a variable weighting that reflects an estimated degree of avoidance of the first primary component by the user following the path other than the path included in directions to the first primary component, wherein the variable weighting is determined based on an amount of time between when the directions to the first primary component were provided and when the user followed the path other than the path included in directions to the first primary component;

and computing the metric based on the variable weightings;

automatically, without user intervention, determining whether the user appears to be avoiding the first primary component in reaching the destination based on the computed metric that measures the user's avoidance of the first primary component in reaching the destination; and in response to a determination that the user appears to be avoiding the first primary component in reaching the destination, automatically, without user intervention, controlling the electronic navigation device to perform an operation directed to using a second primary component in identifying a second route to the destination despite the first primary component remaining a part of a preferred route to the destination according to routing settings at the time of the controlling.

2. The method of claim 1 wherein:

monitoring, using the electronic navigation device, whether the user is following directions to the first primary component in reaching the destination comprises tracking times in which the user has followed a path other than a path included in directions to the first primary component provided in the electronic navigation along the first route to the destination and the re-routing of the user to the first primary component;

computing the metric that measures the user's avoidance of the first primary component in reaching the destination comprises counting, based on the tracking, a number of times in which the user has followed a path other than a path included in directions to the first primary component provided in the electronic navigation along the first route to the destination and the re-routing of the user to the first primary component; and automatically, without user intervention, determining whether the user appears to be avoiding the first primary component in reaching the destination based on the computed metric that measures the user's avoidance of the first primary component in reaching the destination comprises:

comparing the number of times in which the user has followed a path other than a path included in directions to the first primary component to a threshold number of times; and determining whether the user appears to be avoiding the first primary component in reaching the destination based on the comparison of the number of times in which the user has followed a path other than a path included in directions to the first primary component to the threshold number of times.

3. The method of claim 1 wherein:

automatically, without user intervention, determining whether the user appears to be avoiding the first primary component in reaching the destination based on the computed metric that measures the user's avoidance of the first primary component in reaching the destination comprises automatically, without user intervention, determining whether the user appears to be avoiding the first primary component in reaching the destination based on the computed metric that is based on the variable weightings.

4. The method of claim 1 wherein determining a variable weighting that reflects an estimated degree of avoidance of the first primary component by the user following the path other than the path included in directions to the first primary component comprises:

determining whether the path other than the path included in directions to the first primary component is in a direction toward the first primary component; and determining a relatively higher variable weighting when the path other than the path included in directions to the first primary component is determined not to be in the direction toward the first primary component as opposed to when the path other than the path included in directions to the first primary component is determined to be in the direction toward the first primary component.

5. The method of claim 1 wherein determining a variable weighting that reflects an estimated degree of avoidance of the first primary component by the user following the path other than the path included in directions to the first primary component comprises:

determining a relatively higher variable weighting when the determined amount of time is greater.

6. The method of claim 1 wherein automatically, without user intervention, controlling the electronic navigation device to perform an operation directed to using a second primary component in identifying a second route to the destination despite the first primary component remaining a part of a preferred route to the destination according to routing settings at the time of the controlling comprises:

automatically, without user intervention, identifying the second route to the destination, the second route including the second primary component and avoiding the first primary component; and automatically, without user invention, changing to the second route including the second primary component when providing electronic navigation to the destination despite the first primary component remaining a part of a preferred route to the destination according to routing settings at the time of the controlling.

7. The method of claim 6 further comprising:

in response to automatically, without user invention, changing to the second route including the second primary component when providing electronic navigation to the destination despite the first primary component remaining a part of a preferred route to the destination according to routing settings at the time of the controlling, displaying a notification message that indicates that a prior route has been changed based on the user's avoidance of the prior route and that indicates that the prior route remains a preferred route to the destination according to routing settings at the time of the changing.

8. The method of claim 1 wherein automatically, without user intervention, controlling the electronic navigation device to perform an operation directed to using a second primary component in identifying a second route to the destination despite the first primary component remaining a part of a preferred route to the destination according to routing settings at the time of the controlling comprises:
   displaying a suggestion message that suggests identifying an alternative route to the destination that uses an alternative primary component in reaching the destination; and
   displaying, concurrently with or subsequent to the suggestion message, one or more user interface controls that enable the user to either control the electronic navigation device to pursue the alternative route to the destination that uses the alternative primary component in reaching the destination or control the electronic navigation device to maintain a route to the destination that uses the first primary component in reaching the destination.

9. The method of claim 8 wherein displaying the suggestion message comprises displaying the suggestion with an indication that indicates that a current route to the destination that uses the first primary component in reaching the destination is preferred to the alternative route according to routing settings at the time of the controlling.

10. The method of claim 1 wherein automatically, without user intervention, controlling the electronic navigation device to perform an operation directed to using a second primary component in identifying a second route to the destination despite the first primary component remaining a part of a preferred route to the destination according to routing settings at the time of the controlling comprises:
   displaying a suggestion message that indicates that the user appears to be avoiding the first primary component and that suggests avoiding the first primary component in identifying an alternative route to the destination that uses an alternative primary component in reaching the destination; and
   displaying, concurrently with or subsequent to the suggestion message, one or more user interface controls that enable the user to either control the electronic navigation device to pursue an alternative route that avoids the first primary component or control the electronic navigation device to maintain a route to the destination that uses the first primary component in reaching the destination.

11. The method of claim 1 wherein automatically, without user intervention, controlling the electronic navigation device to perform an operation directed to using a second primary component in identifying a second route to the destination despite the first primary component remaining a part of a preferred route to the destination according to routing settings at the time of the controlling comprises:
   identifying a second route to the destination that uses a second primary component in reaching the destination based on routes the user is following in avoiding the first primary component in reaching the destination;
   displaying a suggestion message that indicates that the user appears to prefer the second primary component to the first primary component in reaching the destination and that suggests using the second route to the destination that uses the second primary component in reaching the destination; and
   displaying, concurrently with or subsequent to the suggestion message, one or more user interface controls that enable the user to either control the electronic navigation device to pursue the second route that uses the second primary component in reaching the destination or control the electronic navigation device to maintain a route to the destination that uses the first primary component in reaching the destination.

12. The method of claim 1 wherein automatically, without user intervention, controlling the electronic navigation device to perform an operation directed to using a second primary component in identifying a second route to the destination despite the first primary component remaining a part of a preferred route to the destination according to routing settings at the time of the controlling comprises:
   displaying a suggestion message that suggests a change in the routing settings used in identifying the preferred route to the destination; and
   displaying, concurrently with or subsequent to the suggestion message, one or more user interface controls that enable the user to change the routing settings used in identifying the preferred route to the destination.

13. The method of claim 12 wherein displaying the suggestion message that suggests a change in the routing settings used in identifying the preferred route to the destination comprises:
   analyzing the routing settings to determine whether a change in a particular routing setting results in a different preferred route to the destination that does not include the first primary component;
   based on the analysis, identifying a subset of the routing settings for which a change results in a different preferred route to the destination that does not include the first primary component; and
   displaying the identified subset of the routing settings.

14. The method of claim 12 wherein displaying the suggestion message that suggests a change in the routing settings used in identifying the preferred route to the destination comprises:
   identifying a second route to the destination that uses a second primary component in reaching the destination based on routes the user is following in avoiding the first primary component in reaching the destination;
   analyzing the routing settings to determine whether a change in a particular routing setting results in a different preferred route to the destination that includes the second primary component;
   based on the analysis, identifying a subset of the routing settings for which a change results in a different preferred route to the destination that includes the second primary component; and
   displaying the identified subset of the routing settings.

15. The method of claim 1, wherein:
   identifying the first route to the destination comprises:
   receiving a search for a type of point of interest;
   in response to the search, identifying multiple points of interest that match the type of point of interest included in the search;
   selecting, from among the multiple points of interest, a first point of interest; and
   assigning the first point of interest as the destination.

16. The method of claim 15 wherein automatically, without user intervention, controlling the electronic navigation device to perform an operation directed to selecting, from among the multiple points of interest, a second point of interest despite the first point of interest remaining a preferred point of interest according to routing settings at the time of the controlling comprises:

automatically, without user intervention, identifying the second point of interest;

automatically, without user invention, changing to the second point of interest despite the first point of interest remaining a preferred point of interest according to routing settings at the time of the changing; and displaying a notification message that indicates that a prior point of interest has been changed based on the user's avoidance of the prior point of interest and that indicates that the prior point of interest remains a preferred point of interest according to routing settings at the time of the changing.

17. The method of claim 15 wherein automatically, without user intervention, controlling the electronic navigation device to perform an operation directed to selecting, from among the multiple points of interest, a second point of interest despite the first point of interest remaining a preferred point of interest according to routing settings at the time of the controlling comprises:

displaying a suggestion message that suggests identifying an alternative point of interest in finding the type of point of interest searched for by the user; and displaying, concurrently with or subsequent to the suggestion message, one or more user interface controls that enable the user to either control the electronic navigation device to pursue the alternative point of interest or control the electronic navigation device to maintain the first point of interest.

18. The method of claim 15 wherein automatically, without user intervention, controlling the electronic navigation device to perform an operation directed to selecting, from among the multiple points of interest, a second point of interest despite the first point of interest remaining a preferred point of interest according to routing settings at the time of the controlling comprises:

identifying a geographic attribute that the user appears to be avoiding in finding the type of point of interest searched for by the user, the first point of interest having the geographic attribute;

displaying a suggestion message that suggests avoiding the geographic attribute in finding the type of point of interest searched for by the user; and displaying, concurrently with or subsequent to the suggestion message, one or more user interface controls that enable the user to either control the electronic navigation device to avoid the geographic attribute in finding the type of point of interest searched for by the user or control the electronic navigation device to maintain the first point of interest that has the geographic attribute.

19. The method of claim 1 further comprising:

tracking multiple instances in which the user appears to be avoiding primary components in reaching destinations, the primary components being parts of preferred routes to the destination based on the routing settings of the electronic navigation device;

accessing attribute information for the primary components that the user appears to be avoiding in reaching destinations;

analyzing the attribute information for the primary components that the user appears to be avoiding in reaching destinations;

based on the analysis, identifying attributes that are similar for the primary components that the user appears to be avoiding in reaching destinations;

comparing the identified attributes to the routing settings of the electronic navigation device; and displaying a suggestion message that suggests a change in the routing settings of the electronic navigation device based on the comparison of the identified attributes to the routing settings of the electronic navigation device.

20. The method of claim 1 wherein automatically, without user intervention, controlling the electronic navigation device to perform an operation directed to using a second primary component in identifying a second route to the destination despite the first primary component remaining a part of a preferred route to the destination according to routing settings at the time of the controlling comprises:

determining that the first primary component remains a part of a preferred route to the destination according to routing settings at the time of the controlling; and overriding the determination that the first primary component remains a part of a preferred route to the destination based on the determination that the user appears to be avoiding the first primary component in reaching the destination.

* * * * *